United States Patent
Bader

(10) Patent No.: US 11,364,574 B2
(45) Date of Patent: Jun. 21, 2022

(54) METHOD FOR CONTROLLING A BEAM CUTTING DEVICE HAVING A CUTTING TOOL, COMPUTER-IMPLEMENTED METHOD FOR AUTOMATICALLY DEFINING AND PRODUCING MOVEMENT COMMANDS FOR CONTROLLING A CUTTING TOOL OF A BEAM CUTTING DEVICE, AND BEAM CUTTING DEVICE FOR CARRYING OUT THE METHODS

(71) Applicant: BYSTRONIC LASER AG, Niederoenz (CH)

(72) Inventor: Roland Bader, Ruetschelen (CH)

(73) Assignee: BYSTRONIC LASER AG, Niederoenz (CH)

( * ) Notice: Subject to any disclaimer, the term of this patent is extended or adjusted under 35 U.S.C. 154(b) by 0 days.

(21) Appl. No.: 16/620,843

(22) PCT Filed: Aug. 9, 2018

(86) PCT No.: PCT/EP2018/071697
§ 371 (c)(1),
(2) Date: Dec. 9, 2019

(87) PCT Pub. No.: WO2018/224697
PCT Pub. Date: Dec. 13, 2018

(65) Prior Publication Data
US 2021/0138589 A1     May 13, 2021

(30) Foreign Application Priority Data
Jun. 9, 2017 (WO) .................. PCT/IB2017/053430

(51) Int. Cl.
*B23K 26/70* (2014.01)
*B23K 26/38* (2014.01)
*G05B 19/4061* (2006.01)

(52) U.S. Cl.
CPC ............ *B23K 26/702* (2015.10); *B23K 26/38* (2013.01); *G05B 19/4061* (2013.01)

(58) Field of Classification Search
CPC ...... B23K 26/702; B23K 26/38; B23K 26/70; G05B 19/4061; G05B 2219/36199;
(Continued)

(56) References Cited

U.S. PATENT DOCUMENTS

| | | | |
|---|---|---|---|
| 9,031,688 B2 | 5/2015 | Himeno | |
| 9,104,191 B2 * | 8/2015 | Lee | ......................... G05B 19/18 |

(Continued)

FOREIGN PATENT DOCUMENTS

| | | | | |
|---|---|---|---|---|
| DE | 19637170 | * | 3/1998 | ............. B21D 43/26 |
| DE | 102011088673 | * | 6/2013 | ............... B23Q 1/26 |

(Continued)

OTHER PUBLICATIONS

International Preliminary Report on Patentability, English Translation, for PCT/EP2018/071697, filed Aug. 9, 2018, dated May 31, 2019.

*Primary Examiner* — Rocio Del Mar Perez-Velez
*Assistant Examiner* — Olvin Lopez Alvarez
(74) *Attorney, Agent, or Firm* — Workman Nydegger

(57) ABSTRACT

Controlling a beam cutting device having a cutting tool is disclosed. A workpiece part can be cut out of a workpiece along a cutting contour. A cutting plan for the workpiece having a cutting contour for a workpiece part to be cut out of the workpiece is specified. Subsequently, the relative position of the workpiece and/or of the cutting plan and/or of the workpiece part to be cut out is determined. The relative position of the at least one support point of the workpiece support is determined. Subsequently, at least one risk region on the cutting contour of the workpiece part to be cut out is determined, followed by the defining of at least one (Continued)

starting-cut point and/or one cut-away point for the cutting tool on the cutting contour of the workpiece part to be cut out. A computer-implemented method and a beam cutting device is also disclosed.

28 Claims, 9 Drawing Sheets

(58) Field of Classification Search
CPC .......... G05B 2219/45041; G05B 2219/31077; G05B 2219/45139; G05B 2219/45165; D05D 2305/08; H01L 21/76894; Y10S 408/701

See application file for complete search history.

(56) References Cited

U.S. PATENT DOCUMENTS

| | | | | |
|---|---|---|---|---|
| 2010/0193479 | A1* | 8/2010 | Takada | B23K 37/0461 219/121.6 |
| 2016/0074959 | A1* | 3/2016 | Maeda | H01L 21/681 425/142 |
| 2019/0247961 | A1* | 8/2019 | Ottnad | B23K 26/16 |
| 2021/0229308 | A1* | 7/2021 | Ottnad | B23K 26/0869 |

FOREIGN PATENT DOCUMENTS

| | | | | |
|---|---|---|---|---|
| DE | 102012212566 | * | 1/2014 | ............ B23K 26/38 |
| DE | 102014200208 | * | 6/2015 | ......... B23K 26/0884 |
| DE | 102016220844 | * | 4/2018 | ......... B23K 26/0876 |
| EP | 3159093 | | 4/2017 | |

* cited by examiner a)

b)

METHOD FOR CONTROLLING A BEAM
CUTTING DEVICE HAVING A CUTTING
TOOL, COMPUTER-IMPLEMENTED
METHOD FOR AUTOMATICALLY
DEFINING AND PRODUCING MOVEMENT
COMMANDS FOR CONTROLLING A
CUTTING TOOL OF A BEAM CUTTING
DEVICE, AND BEAM CUTTING DEVICE
FOR CARRYING OUT THE METHODS

The invention relates to a method for controlling a beam cutting device having a cutting tool according to claim 1. The invention further relates to a computer-implemented method for automatically defining and producing movement commands for controlling a cutting tool of a beam cutting device according to claim 21, and a beam cutting device for carrying out the method according to claim 23.

In industrial beam cutting devices, for example laser cutting devices or other fluid beam cutting devices, in particular flatbed cutting devices, workpiece parts of different sizes and shapes are cut out of workpieces, for example metal sheets. In the case of thinner sheets in particular, workpiece parts (or cutting objects) positioned on a workpiece support will often tilt after the cut-away and collide with the cutting head in the further cutting process. This leads to production scrap and damage to the cutting head. Primarily workpiece parts of smaller to medium dimensions (50-400 mm in length) and thin to medium workpiece thickness (up to 8 mm in thickness) are problematic, as well as workpiece parts that have larger inner contours or a complex outer contour.

To reduce the likelihood of damage in the beam cutting device, there are beam cutting devices which actively detect collisions of the cutting head with the tilted workpiece part by means of a sensor system and change the positioning path of the cutting head to avoid costly damage to the cutting head and the beam cutting device.

A disadvantage of this known solution is that a movement of the workpiece takes place and/or an intervention of a user of the beam cutting device is necessary. In addition, it cannot be ruled out that the cutting head will not still be damaged.

U.S. Pat. No. 8,455,787 B2 discloses a laser beam cutting device, wherein a workpiece is positioned on a workpiece support having a plurality of support points. The laser beam of the laser cutting head is moved relative to the workpiece, thereby cutting the workpiece parts out from the workpiece. The laser beam cutting device comprises an evaluation unit, which evaluates the tilting of the workpiece part with a known workpiece support and a known workpiece part to be cut. In order to prevent a subsequent collision of the cutting head with a tilted workpiece part, the cutting head is repositioned vertically or horizontally.

A disadvantage of this known solution is that the tilting of the cut workpiece part from the workpiece is not prevented. This has the consequence that the cutting head must be repositioned several times and the positioning path of the cutting head and thus the cutting process duration are thereby extended.

U.S. Pat. No. 9,031,688 B2 discloses a device for creating a nesting plan for a workpiece placed on a beam cutting device, wherein the workpiece support is taken into account. In this case, the geometric arrangement of the workpiece parts to be cut out of the workpiece is defined iteratively by taking into account the support points of the workpiece support and the workpiece part centres of gravity in such a way that the support stability of all workpiece parts is made as large as possible.

A disadvantage of this known solution is that the position of the support points must be known relative to the workpiece before creating the nesting plan. This is not possible with current loading systems for workpieces on the workpiece support. Since the creation of the nesting plan requires a long computation time, the method is not practicable on current systems. In addition, only the centre of gravity of the workpiece parts is used to assess the stability, so only the static support stability of small parts can be improved since only small parts can rest in a statically unstable manner on the workpiece support.

DE 10 2014 200 208 B3 shows a method for the separating machining of a workpiece using a beam cutting device. Before the machining process, a safety zone is defined around the workpiece part to be cut out, which prevents the collision of the separated and tilted workpiece part with the cutting head of the beam cutting device. In this case, the tilt height of the separate workpiece part is calculated, which is used to define the safety zone around the workpiece part to be cut out. Furthermore, holding parts for each workpiece part to be cut on the workpiece are selected and the machining sequence of the workpiece parts by means of the holding parts are defined.

A disadvantage of the known solution is that the cut workpiece parts tilt after the cut-away and thus the machining process path of the cutting head is extended in a complex cutting plan.

WO 2016/020411 A1 discloses a process for separating machining of a workpiece part, comprising a cutting beam and a working gas beam. The workpiece is positioned on a workpiece support and cut away by the cutting beam. In this case, the gas pressure of the cutting beam acts on the cutting contour of the workpiece part and would cause tilting after the cut-away even in the case of a statically stable workpiece part. In order to prevent tilting, the cutting head is selectively positioned away in a two-phase traversing step, wherein it is driven out of the pressure zone of the cutting gas beam and moved into a gas suction zone next to the nozzle bore. Thus, the pressure impulse acting on the cut part is minimised, which acts because of the switching off of the cutting beam at the cut-away point, to prevent tilting of the separated workpiece part.

A disadvantage of the known solution is that the effect of the gas suction is very small and thus tilting of the separate workpiece part is not prevented even in the case of slightly larger distances between the support points or the support lines of the workpiece support.

The aim of the present invention is thus to provide a method for controlling a beam cutting device having a cutting tool which does not have the aforementioned disadvantages and in particular to provide a method which effectively prevents the tilting of workpiece parts to be cut out on the workpiece support after they are cut away. A further aim of the invention is to provide a computer-implemented method for automatically defining and producing movement commands for controlling a cutting tool of a beam cutting device, and to provide a beam cutting device for carrying out the method.

The aim is achieved by the features of the independent claims. Advantageous developments are set out in the figures and in the dependent claims.

The method according to the invention for controlling a beam cutting device having a cutting tool by means of which at least one workpiece part can be cut out of a workpiece along a cutting contour, wherein the beam cutting device has a workpiece support comprising a plurality of support points for receiving a workpiece, is characterised by the following steps:

Specifying at least one cutting plan for the workpiece having at least one cutting contour for at least one workpiece part to be cut out of the workpiece (step a)).

Subsequently, the relative position and/or orientation of the workpiece and of the cutting plan and of the at least one workpiece part to be cut out is determined with respect to the workpiece support (step b)).

Alternatively or additionally, the relative position and/or orientation of the workpiece or of the cutting plan or of the at least one workpiece part to be cut out is determined with respect to the workpiece support is carried out (step b)).

Further alternatively or additionally, the relative position and/or orientation of the workpiece and of the cutting plan is determined with respect to the workpiece support (step b)).

Further alternatively or additionally, the relative position and/or orientation of the workpiece and of the at least one workpiece part to be cut out is determined with respect to the workpiece support (step b)).

Further alternatively or additionally, the relative position and/or orientation of the cutting plan and of the at least one workpiece part to be cut out is determined with respect to the workpiece support (step b)).

Subsequently, the relative position of the at least one support point of the workpiece support below the at least one workpiece part to be cut out is determined (step c)).

Alternatively or additionally, the number of support points of the workpiece support below the at least one workpiece part to be cut out or of the support points assigned to a workpiece part or cutting object are determined.

Subsequently, at least one risk region on the cutting contour of the at least one workpiece part to be cut out is determined in which a tilting of the at least one workpiece part to be cut out is possible when the workpiece part to be cut out in said risk region is cut away (step d)). Here, the essential factors for tilting of the workpiece after the separation are considered.

Furthermore, at least one starting-cut point for the cutting tool is defined on the cutting contour of the at least one workpiece part to be cut out by taking into account the at least one identified risk region on the cutting contour of the at least one workpiece part to be cut out (step e)).

Alternatively or additionally, at least one cut-away point for the cutting tool is defined on the cutting contour of the at least one workpiece part to be cut out by taking into account the at least one identified risk region on the cutting contour of the at least one workpiece part to be cut out (step e)).

With this method in all of the variants mentioned, the starting-cut point or cut-away point on the at least one workpiece part to be cut out is selected such that when cutting away or cutting out the at least one workpiece part to be cut out, i.e. the cutting object, tilting of the at least one workpiece part to be cut out or the cutting object is prevented. Since the at least one defined starting-cut point or the at least one determined cut-away point is dependent on the previously determined at least one risk region or is taken into account, a predefined cutting plan can be quickly cut by the cutting tool of the beam cutting device, without the cutting tool being damaged by a tilted workpiece part to be cut out. Naturally, risk regions can be defined for each workpiece part to be cut out and taken into account when specifying the respective starting-cut points or cut-away points. In addition, the cut workpiece parts to be cut out can be easily removed using a standard automatic unloading device without the workpiece parts to be cut out being damaged, bent or scratched. This means that any cutting process, no matter how complex, can be carried out without interruption and without rejects from workpiece parts to be cut out or from the entire workpiece, and can therefore be carried out cost-effectively.

The variants described in the method steps mentioned are to be used optionally within a method step and can be combined as desired across the method steps.

A cutting plan comprises at least one workpiece part to be cut out in the workpiece, which is to be separated from the workpiece by the cutting tool of the beam cutting device. The workpiece part to be cut out is enclosed by a cutting contour. The cutting plan is generated on the workpiece before the starting cut of the at least one workpiece part to be cut out, for example via a suitable software application in a computer.

In the case of a plurality of workpiece parts to be cut out in the workpiece, a plurality of cutting sequences of the workpiece parts to be cut out is possible in the cutting plan, all of which can be defined in advance with this method for controlling a beam cutting device comprising a cutting tool.

The cutting contour of the workpiece part to be cut out consists of a plurality of cutting contour points.

Preferably, before or during the defining of at least one starting-cut point and/or cut-away point for the cutting tool on the cutting contour of the at least one workpiece part to be cut out (step e)), the coordinates of the at least one specific starting-cut point and/or cut-away point are stored in a storage means.

Thus, there is a greater selection of starting-cut points or cut-away points for the cutting tool on the cutting contour of the at least one workpiece part to be cut out, and thus the most favourable starting-cut point or cut-away point for the cutting tool of the beam cutting device can be selected by taking into account the optionally determined at least one risk region, wherein their coordinates can then be considered for further optimisation steps.

Advantageously, in step e), a plurality of starting-cut points or a plurality of cut-away points for the cutting tool are defined by taking into account the optionally determined at least one risk region on the cutting contour of the at least one workpiece part to be cut out.

Further advantageously, the plurality of starting-cut points or plurality of cut-away points are defined by taking into account a plurality of previously defined risk regions on the cutting contour of the at least one workpiece part to be cut out.

Thus, when a suitable starting-cut point and/or cut-away point is selected in advance, a tilting of the workpiece part to be cut out is prevented during cutting out.

Preferably, after step e), a cutting process is carried out with the cutting tool starting from the at least one specific starting-cut point, wherein the cutting process involves cutting along the cutting contour using the cutting tool. This ensures precise cutting out of at least one workpiece part to be cut out, without tilting said workpiece part and thus disturbing the further cutting process of the workpiece.

Alternatively, after step e), a cutting process is carried out using the cutting tool starting from the at least one starting-cut point along the cutting contour to the cut-away point of the at least one workpiece part to be cut out, whereby the previously mentioned advantages apply and tilting of the at least one workpiece part to be cut out is prevented.

Preferably, the cutting takes place along the cutting contour of the at least one workpiece part to be cut out using the cutting tool until the at least one workpiece part to be cut out is cut away from the workpiece, whereby the starting-cut point and the cut-away point are identical and precise cutting of the workpiece part to be cut out is made possible.

Advantageously, after the cutting process of the at least one workpiece part to be cut out, a positioning movement of the cutting head takes place, starting from the defined cut-away point.

Advantageously, the puncture point of the cutting beam of the cutting tool is spaced from the at least one starting-cut point, so the workpiece part is largely spared any piercing splashes and contour damages that may occur. After piercing, the cutting beam is guided in a cutting movement, corresponding to the starting-cut contour, to the cutting contour, i.e. to the starting-cut point. In this case (although not an exhaustive list), the starting-cut contour can be a path of a certain length which merges into the cutting contour at a certain angle, or a path of a certain length which is followed by a transition radius to the cutting contour. However, it is also possible for an insertion to be made directly at the starting-cut point, so no starting-cut contour is used.

In the following, the mention of the starting-cut contour as a geometric element to be cut before the starting-cut point is omitted, since this has no significance for the tilting behaviour of the workpiece part to be cut subsequently.

Preferably, a machining force is defined on at least one cutting contour point of the cutting contour of the at least one workpiece part to be cut out, which can be used for the exact mechanical calculation of the tilting behaviour and thus for determining the risk region.

The defined machining force on the at least one cutting contour point of the cutting contour of the at least one workpiece part to be cut out is that force which, owing to the cutting beam of the cutting tool, actually acts on this cutting contour point of the cutting contour of the workpiece part to be cut out when the at least one workpiece part to be cut out is cut away.

Alternatively or additionally, the machining force is defined at least at a cutting contour point of the cutting contour adjacent to the at least one cutting contour point, in particular as a function of the geometry of the cutting contour at these cutting contour points, thus providing greater flexibility in the selection of the starting-cut point or cut-away point.

Advantageously, the machining force is defined as a function of at least one cutting parameter of the cutting tool, so that, for example, the machining force of the cutting beam can be accurately taken into account after the at least one workpiece part to be cut out of the workpiece is cut away.

Further advantageously, the at least one cutting parameter of the cutting tool, which can be used to define the machining force, is at least one cutting tool parameter, such as a cutting gas pressure, a nozzle spacing, a nozzle diameter or a nozzle shape so that the tilt stability of at least one workpiece part to be cut out can be defined in an improved manner. The invention has found that to assess the stability, not only the centre of gravity of the workpiece parts has to be taken into account, by which only the static support stability can be optimised, but that there are other parameters to be considered, which have an influence on the position stability of the workpiece parts and are not taken into account in the known solutions. Thus, it has been found by the invention that the process gas or cutting gas pressure exerts a considerable force on the workpiece part which, even in the case of a statically stable support of the workpiece part to be cut out, may cause tilting immediately after cutting. These relevant cutting parameters, in particular the cutting gas pressure, are included according to the invention in determining the risk region.

Alternatively or additionally, the at least one cutting parameter of the cutting tool, which can be used for defining the machining force, is at least one positioning parameter, such as a positioning speed, a positioning acceleration, a positioning direction, which is based on the positioning movement of the cutting head immediately after the workpiece part to be cut out is cut away. The invention has found that the positioning parameters immediately after the cut-away of the workpiece part can also be important for the determination of the risk region.

With the aforementioned cutting tool and positioning parameters, an accurate calculation of the machining force acting at the time of the cutting away is possible, so the tilting behaviour of the at least one workpiece part to be cut out before machining of the workpiece and thus the risk regions can be defined precisely.

At least one workpiece part parameter of the at least one workpiece part to be cut out is preferably determined after the relative position of the at least one support point of the workpiece support below the at least one workpiece part to be cut out (step c)) is determined, thus further enabling accurate calculation of the tilting behaviour of the at least one workpiece part to be cut out.

Advantageously, the centre of gravity of the at least one workpiece part to be cut out is used as at least one workpiece part parameter of the at least one workpiece part to be cut out so that the support stability of the at least one workpiece part to be cut out can be defined easily.

Further advantageously, at least one line of gravity of the at least one workpiece part to be cut out is used as at least one workpiece part parameter of the at least one workpiece part to be cut out, so a more flexible stability parameter can be used.

Further advantageously, the cutting contour curvature of the at least one workpiece part to be cut out is used as at least one workpiece part parameter of the at least one workpiece part to be cut out, so, in combination with the determined position of at least one support point of the workpiece support, the tilt stability of the at least one workpiece part to be cut out can be determined more accurately.

Alternatively or additionally to the aforesaid determination of the at least one workpiece part parameter of the at least one workpiece part to be cut out, at least one polygon parameter of a support polygon is determined within the workpiece part to be cut out. This makes it possible to see a simplified illustration of the support situation of the at least one workpiece part to be cut out.

In this case, the support polygon is defined as the convex comprehensive polygon of all support points of the workpiece support, which lie within the observed workpiece part to be cut out.

Advantageously, a support line of the support polygon is used as at least one polygon parameter of a support polygon, so the support stability of the at least one workpiece part to be cut out is particularly easy to define. For example, a nearest support line or additionally at least the nearest support line thereafter is used, thus allowing increased flexibility in the method. As a result, the precise mechanical calculation of the tilting tendency of the workpiece parts to be cut out is made possible by taking into account the cutting tool.

Further advantageously, at least one polygon parameter of a support polygon is a number of corner points of the support polygon, which makes it particularly easy to define the at least one polygon parameter.

Subsequently, a permissible force at at least one cutting contour point of the cutting contour of the at least one workpiece part to be cut out is defined by means of the at least one workpiece part parameter and the determined position of the at least one support point of the workpiece support within the workpiece (variant 1).

The permissible force is defined as the force which when acting on a cutting contour point of the cutting contour tilts the workpiece part to be cut out at the moment it is cut away.

Alternatively or additionally, the aforementioned permissible force at at least one cutting contour point of the cutting contour of the at least one workpiece part to be cut out is defined by means of the at least one polygon parameter and the determined position of the at least one support point of the workpiece support within the workpiece (variant 2 or variant 3).

In a further alternative, the aforementioned permissible force at at least one cutting contour point of the cutting contour of the at least one workpiece part to be cut out is defined by means of the at least one workpiece part parameter and at least one distance of the determined position of the at least one support point of the workpiece support within the workpiece from the at least one cutting contour point of the cutting contour of the at least one workpiece part to be cut out (variant 4).

In a further alternative or addition to the aforementioned variant, the aforementioned permissible force at at least one cutting contour point of the cutting contour of the at least one workpiece part to be cut out is defined by means of the at least one polygon parameter and at least one distance of the determined position of the at least one support point of the workpiece support within the workpiece from the at least one cutting contour point of the cutting contour of the at least one workpiece part to be cut out (variant 5 or variant 6).

Advantageously, the permissible force is defined at a plurality of cutting contour points of the cutting contour of the at least one workpiece part to be cut out so that, for example, the permissible force at at least one partial contour of the cutting contour is comprehensively defined preferably on the entire cutting contour and the flexibility in the method is increased.

Advantageously, use is made of the at least one distance of the determined position of the at least one support point of the workpiece support within the workpiece part to be cut out from the at least one cutting contour point of the cutting contour of the at least one workpiece part to be cut out.

Advantageously, the permissible force is defined by means of the centre of gravity and at least one support line of the support polygon of the determined position of the at least one support point of the workpiece support within the workpiece part to be cut out, which have at least one distance between each other, and at least one distance between the at least one support line and the at least one cutting contour point of the cutting contour of the at least one workpiece part to be cut out, so the permissible force can be defined particularly effectively.

Preferably, while at least one risk region on the cutting contour of the at least one workpiece part to be cut out (step d)) is determined, a force comparison of the permissible force with at least one previously defined tilting force limit value takes place on at least one cutting contour point of the cutting contour of the at least one workpiece part to be cut out so that before cutting using the cutting tool of the beam cutting device, risk regions on the cutting contour, i.e. regions of the cutting contour without resistance to tilting during cut-away, and risk-free regions of the cutting contour, i.e. regions having sufficient resistance to tilting, can be defined. The resistance to tilting thus indicates for each cutting contour point of the cutting contour the ratio of permissible force and the previously defined tilting force limit value.

Advantageously, the force comparison takes place with a tilting force limit value, according to the previously defined machining force on at least one of the cutting contour points of the cutting contour of the at least one workpiece part to be cut out, which thus ensures the resistance to tilting before cutting using the cutting tool of the beam cutting device.

Further advantageously, the previously defined machining force is multiplied by a safety factor so that the resistance to tilting is further increased and thus tilting of the workpiece part to be cut out of the workpiece is reliably prevented.

The determined at least one risk region on the cutting contour of the at least one workpiece part to be cut out (step d)) is preferably defined on the basis of the force comparison. This makes it possible to carry out a particularly precise determination of the at least one risk region.

Preferably, at least one low-risk region of cutting contour points of the cutting contour is defined in the force comparison, in which the maximum permissible force exceeds at least one minimum tilting force limit value, whereby a plurality of starting-cut points and/or cut-away points in a region (a subset of cutting contour points) of the cutting contour can be defined which only one have a low risk of tilting during cutting away, and subsequently the sequence of a plurality of workpiece parts to be cut or to be cut out can be optimised. In this case, selected positioning parameters of the cutting tool can be taken into account.

Alternatively or additionally, at least one risk-free region of cutting contour points of the cutting contour is defined in the force comparison in which the permissible force at least exceeds a maximum tilting force limit value, whereby a plurality of starting-cut points and/or cut-away points in a region (a subset of cutting contour points) of the cutting contour can be defined, which certainly cause no tilting of the at least one workpiece part to be cut out during cutting away and thus, by taking into account one or more arbitrary positioning parameters of the cutting tool, the starting-cut point and/or cut-away point can be selected in this region of the cutting contour.

Preferably, the force comparison of the permissible force takes place with a minimum tilting force limit value, which, if exceeded, represents at least one low-risk region. In this region, a fast three-axis positioning movement, in particular an initially horizontal positioning movement of the cutting tool of the beam cutting device can be carried out after the cutting away of the at least one workpiece part to be cut out.

Advantageously, the minimum tilting force limit value is derived from the minimum machining force, which arises after the cutting away of at least one workpiece part to be cut out of the workpiece. As a result, when the minimum machining force on at least one cutting contour point of the cutting contour is exceeded, tilting of the at least one workpiece part to be cut out can be prevented. Thus, a fast three-axis positioning movement, which is usual on modern beam cutting devices, for example flatbed beam cutting devices, can be carried out, which exerts only a minimal machining force at the time of the cutting away and in the following short period of interaction on the at least one workpiece part to be cut out. Three-axis refers to a positioning movement of the cutting head, which also includes a movement of the vertical drive axis Z simultaneously with the movement of the horizontal drive axes X, Y.

Alternatively or additionally, the force comparison of the permissible force takes place with a maximum tilting force limit value, which, if exceeded, represents at least one risk-free region. In this region, a simple positioning movement of the cutting tool of the beam cutting device can also take place after the cutting away of the at least one workpiece part to be cut out of the workpiece. Thus, the cutting head can be lifted vertically immediately after the cutting away, and the workpiece part to be cut out does not tilt, even though the cutting beam acts with full force on the workpiece part during the vertical movement.

Naturally, other positioning parameters are used for the positioning movement of the cutting head than in the aforementioned three-axis positioning method.

Advantageously, the maximum tilting force limit value is derived from a maximum machining force, which in turn can be calculated from the cutting tool parameters and positioning parameters. Thus, the maximum possible force which the cutting tool exerts on the at least one workpiece part to be cut out of the workpiece at the time of cutting away is used, and the risk-free region can be determined very accurately.

Naturally, the cutting contour points of the cutting contour of the at least one workpiece part to be cut out which do not lie in the aforementioned low-risk and risk-free regions form the risk region according to step d). Naturally, in addition to a minimum and maximum tilting force limit value, further lower and higher, in particular intermediate, limit values are also possible which allow other graded regions to be determined, and thus allow fine gradations in the selection of the positioning parameters of the positioning movement after the cutting away of at least one workpiece part to be cut out.

Preferably, after step b), the position of the at least one workpiece part parameter to be cut out is determined relative to the position of the at least one polygon parameter of the support polygon, whereby the static support stability of the at least one workpiece part to be cut out is determined. The static support stability of a workpiece part to be cut out changes if, for example, a workpiece part to be cut out is arranged within a further workpiece part to be cut out and a workpiece part to be cut out is cut out before the outer workpiece part to be cut out.

Alternatively or additionally to determining the position of the at least one workpiece part parameter to be cut out relative to the position of the at least one polygon parameter of the support polygon, the parity of the permissible force is defined. Thus, in the case of a negative permissible force, an unfavourable support stability of the at least one workpiece part to be cut out can be easily determined and combined with the advantages already mentioned.

Advantageously, alternatively or additionally to determining the position of the at least one workpiece part parameter to be cut out relative to the position of the at least one polygon parameter of the support polygon, it is checked whether the at least one risk region defined in step d) comprises all cutting contour points of the cutting contour. If this is the case, a repositioning of the workpiece or the workpiece part to be cut out can be carried out.

Preferably, at least one microbridge is left in the cutting contour of the at least one workpiece part to be cut out, whereby at least one workpiece part to be cut out is secured against tilting. For example, a microbridge on a workpiece becomes necessary if the at least one risk region defined in step d) comprises all cutting contour points of the cutting contour, i.e. if the minimum tilting force limit value on no cutting contour points of the cutting contour is reached by the permissible force, or if the support stability is too low. In this case, the at least one microbridge is usually applied to outer contours of the workpiece parts to be cut out.

If a microbridge is left in a cutting contour of a workpiece part, there is no cut-away point for this workpiece part but only one or more starting-cut points.

Advantageously, at least one microbridge is designed such that during the separating machining of the cutting contour of the at least one workpiece part to be cut out, at least one section of the path before the cut-away point remains unmachined, as a result of which cutting away and thus tilting of the workpiece part does not occur. As a result, the entire cutting contour can also be cut without interruption, as in separating machining without a microbridge.

Further advantageously, the at least one microbridge is produced at that cutting contour point or at that subset of cutting contour points at which the permissible force reaches a negative minimum value. This also results in maximum positional stability for the at least one workpiece part to be cut out with only two support points together with the at least one microbridge.

Furthermore, the at least one microbridge is advantageously produced on an extension of a connecting line from at least one support point of the workpiece support to at least one workpiece part parameter, for example the centre of gravity. As a result, workpiece parts to be cut out are also secured against tilting by means of only one support point.

Alternatively or additionally to leaving the at least one microbridge in the cutting contour of the at least one workpiece part to be cut out, at least one workpiece part to be cut out of the workpiece is cut up by the cutting tool. This ensures that the cutting contours to be cut out fall directly through the workpiece support after cutting away, without colliding with the cutting tool, in particular in the case of holes or cut-outs in workpiece parts that are at risk of tilting.

Preferably, the relative position and/or orientation of the workpiece and/or of the at least one workpiece part to be cut out is determined with respect to the workpiece support (step b)), and/or at least the relative position of the at least one support point of the workpiece support, below the at least one workpiece part to be cut out (step c)), is determined using at least one detection means, wherein the at least one detection means includes a sensor system of the beam cutting device, whereby the relative position and orientation of the workpiece on the workpiece support can be automatically determined.

The sensor system is advantageously located on the cutting head of the beam cutting device. In this way, the workpiece positioned on the workpiece support or the at least one workpiece part to be cut out can be detected in high resolution.

Preferably, the sensor system consists of a group of optical detectors, contactless distance-measuring means and a camera so that the relative position of the workpiece on the workpiece support can be determined precisely.

Advantageously, at least one edge of the workpiece is detected in this way, whereby the position and orientation of the workpiece are very easy to measure.

Alternatively or additionally, an edge of the at least one workpiece part to be cut out is detected so that the workpiece to be cut out can be detected precisely.

The at least one workpiece part parameter is preferably defined using at least one detection means, whereby the relative position of the at least one workpiece part to be cut out on the workpiece support can be determined.

Alternatively, the at least one polygon parameter of the support polygon is defined using at least one detection means, whereby a freely selectable support of the at least one workpiece part to be cut out on the workpiece support can be easily defined.

Further alternatively, the at least one workpiece part parameter and the at least one polygon parameter of the support polygon in step b1) is defined using at least one detection means, whereby the two advantages mentioned can be combined and a reliable continuation of the cutting process is ensured.

Alternatively, the relative position and/or orientation of the workpiece with respect to the workpiece support (step b)) is determined by means of at least one mechanical stop of the beam cutting device for the workpiece. As a result, there is no need to use a detection means, and the support points are predetermined.

Preferably, after determining the relative position in accordance with step b) and after determining the at least one risk region in accordance with step d), the at least one workpiece part to be cut out is repositioned, whereby an unfavourable relative position of the at least one workpiece part to be cut out on the workpiece support can be responded to. This takes place in particular if all cutting contour points of the cutting contour of at least one workpiece part to be cut out are arranged in the at least one risk region.

Alternatively, after determining the relative position in accordance with step b) and after determining the at least one risk region in accordance with step d), the entire workpiece is repositioned, whereby an unfavourable relative position of the workpiece on the workpiece support can be responded to. This can be carried out in particular if the risk regions of the cutting contours of many workpiece parts to be cut out contain many or almost all cutting contour points.

Advantageously, the at least one workpiece part to be cut out is repositioned according to a previously created cutting plan on the workpiece, whereby the position on the cutting plan can be responded to.

Advantageously, the at least one workpiece part to be cut out is repositioned according to a previously changed cutting plan on the workpiece, whereby the flexibility of the repositioning is increased.

Alternatively or additionally, at least the support points, which lie below the workpiece or the at least one workpiece part to be cut out, are repositioned so that the workpiece support can also be used to respond to unfavourably positioned workpieces.

Preferably, at least one risk region on the cutting contour of the at least one workpiece part to be cut out (step d)) is determined and/or at least one starting-cut point and/or at least one cut-away point for the cutting tool (step e)) is defined according to the geometry of the cutting contour of the at least one workpiece part to be cut out, whereby unfavourable cutting contour regions can be avoided and a lower machining force can be used when cutting the at least one workpiece part to be cut out.

In particular, at least one risk region on the cutting contour of the at least one workpiece part to be cut out (step d)) is determined and/or at least one starting-cut point and/or at least one cut-away point for the cutting tool (step e)) is defined according to the cutting contour curvature of the cutting contour of the at least one workpiece part to be cut out, whereby the probability of tilting of the at least one workpiece part to be cut out is reduced.

Advantageously, the starting-cut point is selected on a convex cutting contour section of the at least one workpiece part to be cut out, whereby the likelihood of tilting of the at least one workpiece part to be cut out is additionally reduced.

Advantageously, at least one risk region on the cutting contour of the at least one workpiece part to be cut out (step d)) is determined and/or the at least one starting-cut point and/or at least one cut-away point for the cutting tool (step e)) is defined according to a cutting contour curvature averaged over a plurality of cutting contour points of the cutting contour, whereby the starting-cut point and/or cut-away point is selected in a flexible manner.

Advantageously, at least one risk region on the cutting contour of the at least one workpiece part to be cut out is determined (step d)) and/or the at least one starting-cut point and/or at least one cut-away point for the cutting tool (step e)) is defined according to a positive and negative cutting contour curvature averaged in the radius of the effective region of a cutting tool parameter, for example the cutting gas pressure. As a result, the machining force in the cut-away point can be additionally reduced.

Advantageously, at least one risk region on the cutting contour of the at least one workpiece part to be cut out is determined (step d)) and/or at least one starting-cut point and/or at least one cut-away point for the cutting tool is defined (step e)) more accurately by means of at least one selection straight line which is inclined with respect to the cutting contour point normal by the selection angle, wherein an intersection of the selection straight line with a further cutting contour point adjacent to the cutting contour point leads to an elimination of the cutting contour point as a starting-cut point or to the classification of the cutting contour point into a risk region of the cutting contour. In this case, the selection straight line or the selection angle is defined by a cutting tool parameter, for example, by the outflow cone angle or by the hopping angle in the case of fly positioning and is dependent on the cutting nozzle type on the cutting tool. This selection of the possible starting-cut points is thus further restricted and the tilting behaviour is calculated more precisely.

Advantageously, the at least one defined selection straight line is a component of an isosceles triangle, wherein the length of the at least one defined selection straight line describes the effective region of the cutting beam of the cutting tool. As a result, only those cutting contour points are eliminated at which a cutting away actually means an increased risk of tipping.

Preferably, the defined starting-cut points of the workpiece parts to be cut out are lined up on the workpiece to optimise the cutting sequence, and the starting cut is made at one of the defined starting-cut points. This minimises the cutting process duration.

Preferably, the defined cut-away points of the workpiece parts to be cut out are lined up on the workpiece to optimise the cutting sequence, and the starting cut is made at one of the defined cut-away points. This minimises the cutting process duration.

Alternatively or additionally, the defined starting-cut points of the workpiece parts to be cut out are lined up on the workpiece to optimise the positioning path of the cutting tool on the workpiece, and the starting cut is made at one of the defined starting-cut points. This minimises the cutting process duration.

Alternatively, the defined cut-away points of the workpiece parts to be cut out are lined up on the workpiece to optimise the positioning path of the cutting tool on the workpiece, and the starting cut is made at one of the defined cut-away points. This minimises the cutting process duration.

Advantageously, pre-determined low-risk regions of cutting contour points of the cutting contour of the workpiece parts to be cut out on the workpiece, for optimising the cutting sequence of the workpiece parts to be cut out, and their workpiece contours are lined up, and the starting cuts of all workpiece parts to be cut out at the optimal cutting contour points are made at the optimal cutting contour points of the cutting contours of the workpiece parts. This guarantees very tilt-resistant cutting with a minimum cutting process duration.

Advantageously, the cutting sequence of workpiece parts to be cut out and their workpiece contours are optimised in that no workpiece part already cut out from the workpiece lies in the positioning path of the cutting tool, so the cutting tool cannot pass over a cut-out workpiece part, which in turn could tilt because of the cutting gas pressure acting thereon.

Further advantageously, the cutting sequence is optimised in that already cut-out workpiece parts are circumvented in the positioning process of the cutting tool so that workpiece parts that have already been cut out are not traversed and tilted either.

Further advantageously, the cutting sequence of the cutting tool is optimised in that the cutting head is first raised vertically and then biaxially positioned, for example, with the cutting beam turned off, over the already cut-out workpiece parts. This is possible if the corresponding cut-away lies in a risk-free, i.e. non-tilting region of the cutting contour. If during the positioning movement no already cut-out workpiece parts are passed over, the cutting beam does not have to be switched off, even in the case of biaxial positioning. This can reduce the positioning time.

Moreover, it is advantageous if, depending on the aforementioned optimisations of the cutting sequence, the positioning path is minimised so that the cutting process is completed in the shortest possible time.

Preferably, before determining the relative position and/or orientation of the workpiece and/or of the cutting plan with respect to the workpiece support (step b)), the contour size of the at least one workpiece part to be cut out is defined, whereby the procedure according to the invention can be simplified beforehand.

Advantageously, the at least one workpiece part to be cut out is surrounded by at least one geometric figure, for example a polygon or a circle, so that the contour size of the workpiece part to be cut out can be easily defined.

Advantageously, the geometric figure is formed as a quadrilateral, for example a rectangle, whereby the contour size of the workpiece part to be cut out can be defined particularly easily.

Advantageously, the at least one geometric figure is formed as an axis-parallel rectangle, being parallel to the axis in the sense of parallel to at least one of the support elements of the workpiece support, whereby the contour size of the at least one workpiece part to be cut out is determined easily and, at the same time, the workpiece support is taken into account.

In addition, before determining the relative position and/or orientation of the workpiece and/or the cutting plan with respect to the workpiece support (step b)), the determined contour size of the at least one workpiece part to be cut out is assigned to at least one previously defined contour size class. Thus, the at least one workpiece part to be cut out can be easily classified.

Advantageously, a plurality of contour size classes is defined so that different workpiece parts to be cut out are simply combined.

Advantageously, the contour size class is defined according to the workpiece support, wherein at least one distance of a support element of the workpiece support from at least one further support element of the workpiece support is taken into account. Thus, the spaces between the support elements are defined and, depending on the workpiece support used, the possible contour size classes can be defined in advance.

Advantageously, the workpiece support is parameterised so that the possible contour size classes can be easily defined according to the workpiece support used.

Advantageously, the contour size classes are defined such that at least one risk region does not have to be determined for at least one workpiece part to be cut out of at least one of the contour size classes. This reduces calculation effort.

Advantageously, the at least one contour size class is defined such that workpiece parts to be cut out with contour sizes which are smaller than the distance between two support elements form a contour size class. These workpiece parts to be cut out, which usually represent inner contour tool parts or holes or cut-outs, fall away freely between the support elements of the workpiece support after they are cut away.

Advantageously, the at least one contour size class is defined such that workpiece parts to be cut out with contour sizes which form a contour size class smaller than half and/or smaller than one third or preferably smaller than a parameterisable fraction of the distance between two support elements and/or support points, wherein it is thus ensured that this contour size class has only workpiece parts to be cut out which fall securely between the support elements of the workpiece support.

Preferably, an already classified workpiece part to be cut out is not classified further, so all cutting contours of all workpiece parts of the workpiece are uniquely assigned to a contour size class.

As an alternative to the aforementioned defining and force comparisons, the defining and comparing of moments is equivalently possible, whereby not only the acting forces at at least one cutting contour point of the cutting contour of the at least one workpiece part to be cut out are defined, but also the acting moments at at least one cutting contour point of the cutting contour are defined and compared. For example, the acting forces at at least one cutting contour point of the cutting contour of the at least one workpiece part to be cut out are defined from at least one moment equation.

Preferably, the method steps and elements are imaged in a virtual space, wherein the workpiece support is virtual and the at least one cutting plan includes at least one piece of information on the position of the virtual workpiece support relative to the virtual workpiece.

Alternatively or additionally, the method steps and elements are imaged in a virtual space, wherein the workpiece support with the support points is virtual and the at least one cutting plan includes at least one piece of information on the orientation of the virtual workpiece support relative to the virtual workpiece. Thus, the method described above can be performed purely virtually. Furthermore, the at least one cutting plan can be determined or designed flexibly.

Preferably, a set of cutting plans is specified with at least one further cutting plan, wherein the position of the virtual workpiece support in each cutting plan of the set is different and offset in the x and y directions. In this way, a plurality of cutting plans can be created before the actual machining or cutting process in which risk regions are defined by taking into account the position of the virtual workpiece support and the virtual support points. The starting-cut and/or cut-away points are set accordingly as a function of the risk regions determined.

In an advantageous variant, a set of cutting plans is specified with at least one further cutting plan, wherein the orientation of the virtual workpiece support in each cutting plan of the set is different. Thus, in addition to the aforementioned advantage, cutting plans can be calculated in advance which have a slightly twisted virtual workpiece support, whereby a cutting plan can be virtually optimised in advance for every actually possible support situation of the workpiece on the workpiece support of the beam cutting device.

Preferably, each cutting plan is selected from the set of cutting plans which has the greatest match of the at least one piece of information on the position and/or orientation of the at least one workpiece part to be cut out relative to the virtual workpiece support with an actually determined position and/or orientation of the workpiece support of the beam cutting device relative to the workpiece. Thus, the cutting plan can be selected which reflects an actual situation of the workpiece on the workpiece support having the closest possible match.

That cutting plan is selected from the set of cutting plans immediately before the cutting process is carried out on the beam cutting device, whereby the beam cutting device can select that cutting plan which best matches the support situation of the at least one workpiece part to be cut out.

Preferably, the selected cutting plan of the set is optimised with respect to the actual position of the workpiece support relative to the workpiece according to the method according to the invention, whereby the cutting plan with the information on the position and/or orientation of the virtual workpiece support and the resulting risk regions of workpiece parts to be cut out can be further adjusted with respect to the actual conditions of the workpiece on the workpiece support. A tilting of workpieces when being cut away can be prevented with the greatest degree of certainty.

In an advantageous further development of the invention, a sequence of at least two starting-cut points and/or cut-away points for the cutting tool on the cutting contours of at least two workpiece parts to be successively cut out in the sequence is defined by taking into account more than one identified risk region on the cutting contours of the at least two workpiece parts successively to be cut out. Advantageously, even in a sequence of workpieces cut in succession, unwanted tilting of one or more of these workpieces is thus not able to occur, in particular if the cutting of the second workpiece in the sequence can influence the one already cut. This is taken into account in defining the sequence so that none of the workpieces can tilt depending on the cutting of the other.

Preferably, the two workpiece parts to be successively cut out are arranged adjacent to each other, preferably side by side. The workpiece parts may be selected such that the intermediate positioning path is free of cut workpiece parts. This means that on the intermediate positioning path, no already cut workpiece parts are passed over.

The method according to the invention can also be used as a computer-implemented method for automatically defining and generating geometric elements, wherein after step e) at least one data set having geometric elements which at least specifies the at least one starting-cut contour is automatically generated and stored.

Alternatively or additionally to the automatic generation and storage of at least one data set with geometric elements, at least one movement command is automatically generated and stored which specifies at least the movement of the cutting tool to the at least one starting-cut point and/or to the at least one cut-away point.

Using this computer-implemented method, the cutting plan, according to which at least one workpiece part to be cut out of a workpiece is cut, can be created either on a computer of the beam cutting device or on a computer independent of the beam cutting device. The cutting process sequence and/or the positioning path of the cutting tool can be optimised such that no workpiece parts to be separated tilt and thus no collision of the at least one workpiece part to be cut out can occur with the cutting head and no workpiece parts can become scratched, bent or damaged during automatic unloading, and such that the entire positioning path or the entire positioning time are minimal.

Advantageously, a plurality of data sets having geometric elements and/or a plurality of movement commands which specify at least the at least one starting-cut contour and/or specify at least the movement of the cutting tool to the at least one starting-cut point and/or to the at least one cut-away point are generated and stored automatically. In this way, the positioning movements of the cutting tool can be reliably controlled for all workpiece parts of the workpiece.

Preferably, the stored data sets having geometric elements and/or the stored movement commands which at least specify the at least one starting-cut contour and/or at least the movement of the cutting tool to the at least one starting-cut point and/or to the at least one cut-away point are transmitted to the control means of the beam cutting device. Thus, the cutting process can then be started immediately.

Preferably, the at least one data set having geometric elements and/or the at least one stored movement command, advantageously a plurality of data sets having geometric elements and/or a plurality of movement commands, are stored as a cutting plan variant of the workpiece in a storage means, whereby the entire cutting plan including all defined starting-cut contours and/or defined starting-cut points and/or defined cut-away points is stored and then the cutting process can be carried out without interruption, in a single pass, for all workpiece parts to be cut out by the cutting tool.

According to the invention, a beam cutting device comprising a cutting tool, a workpiece support, a control means and at least one storage means, as well as an above-described detection means and/or an above-described mechanical stop are adapted to carry out one of the methods disclosed above.

Thus, a pre-defined cutting plan can be carried out quickly and without interruption using the cutting tool of the beam cutting device without the workpiece parts to be cut out tilting and without the cutting tool being damaged by a tilted workpiece part to be cut out. The at least one workpiece part to be cut out can be quickly and inexpensively cut out in a fully automatic cutting process from the workpiece.

Further advantages, features and details of the invention arise from the following description in which exemplary embodiments of the invention are described with reference to the drawings.

The list of reference signs, as well as the technical content of the claims and figures, are part of the disclosure. The figures are described coherently and comprehensively. The same reference signs denote the same components;

reference signs with different indices indicate functionally identical or similar components.

Figure 1:
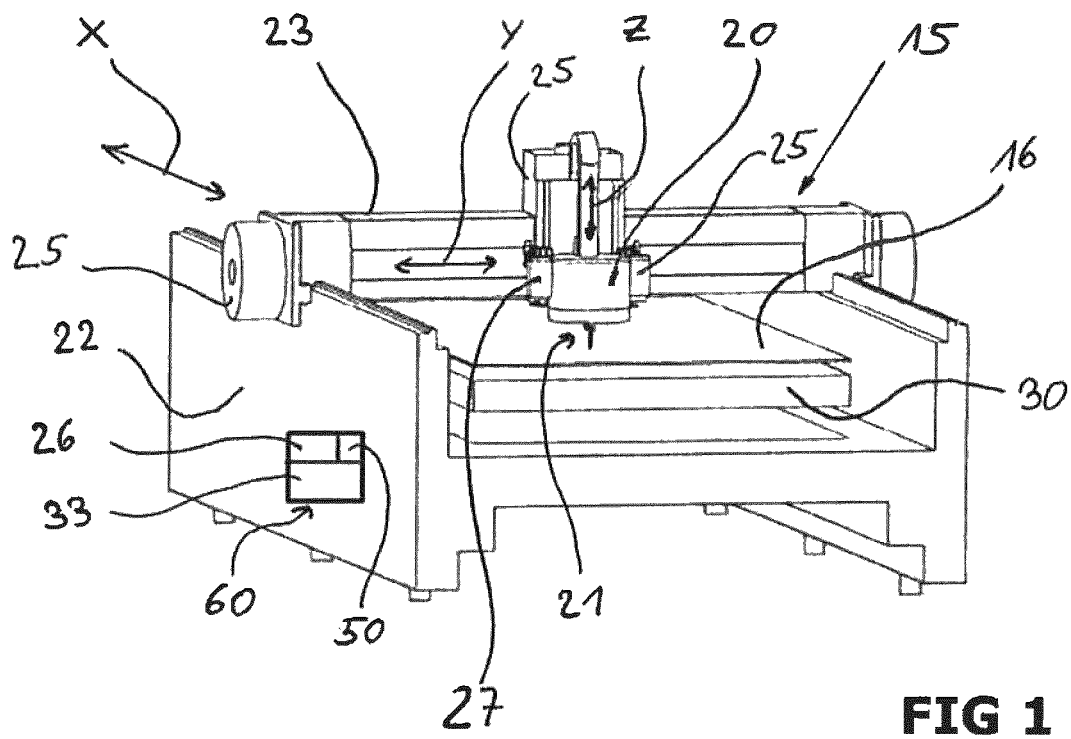
FIG. 1 shows a perspective view of a beam cutting device, on which the methods according to the invention can be carried out.
Figure 2:
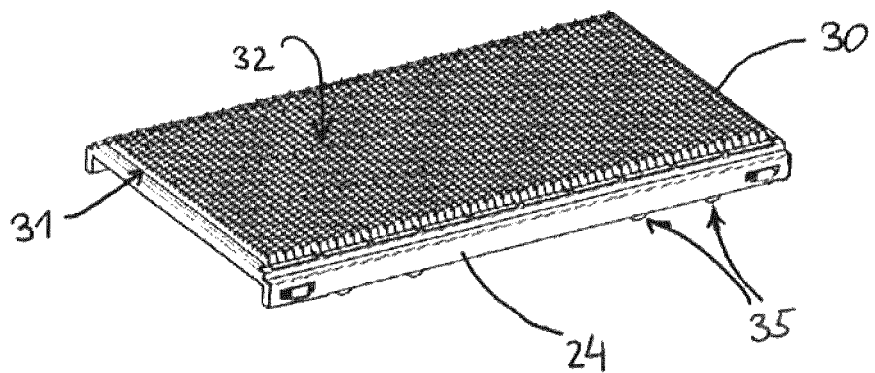
FIG. 2 shows a perspective view of a workpiece support of the beam cutting device according to FIG. 1.
Figure 3:
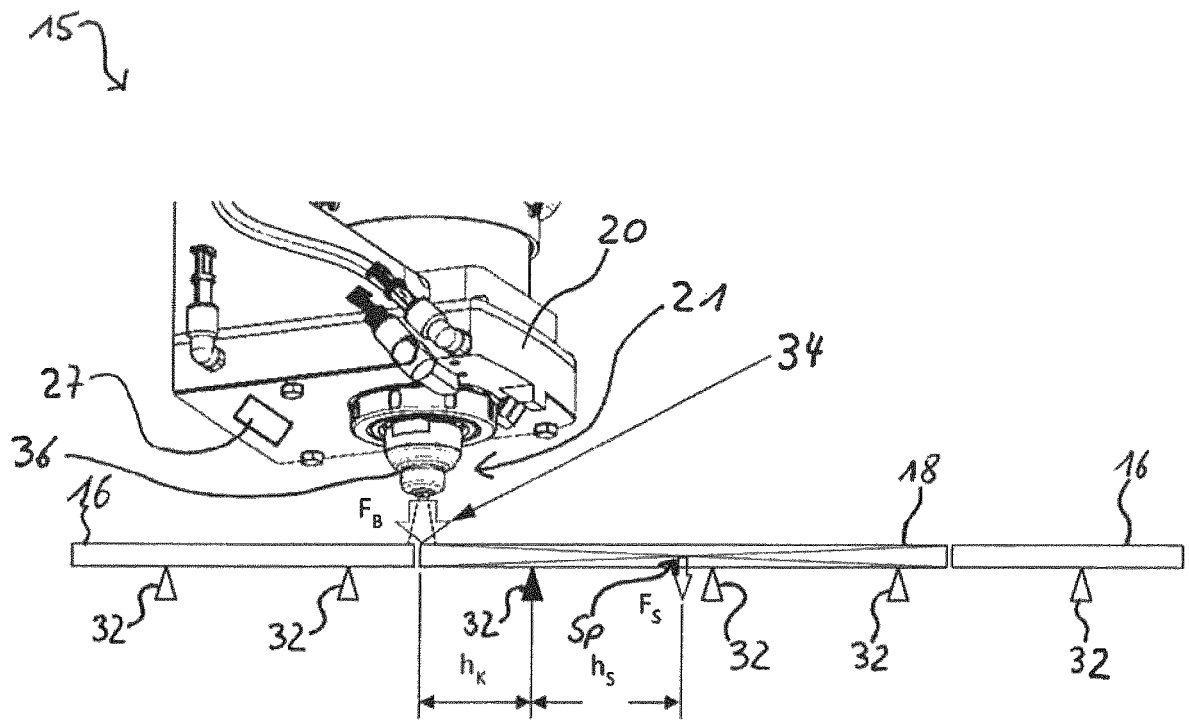
FIG. 3 shows a detailed view of a cutting head of the beam cutting device and the workpiece support of the cutting device together with the workpiece and workpiece part according to FIG. 1 and FIG. 2.

The beam cutting device 15 shown in FIGS. 1 to 4 for cutting out a workpiece part 18 from a workpiece 16 comprises a cutting tool 21 on a cutting head 20 and a workpiece support 30. The cutting head 20 and the workpiece support 30 are supported by a rack 22 of the beam cutting device 15 and are movable relative to each other. The cutting head 20 is moveably mounted on a bridge 23 of the beam cutting device 15 along the drive axes Y, Z. The bridge 23 in turn can be moved along the drive axis X. The drives 25 required for this purpose are controlled by a drive control 26 of the control means 60 so that the cutting head 20 can also perform rapid positioning movements with precise positioning parameters in addition to precise travel paths for the cutting contours 17 for cutting out the workpiece parts 18.

The positioning parameters mentioned do not include a positioning speed, a positioning acceleration, a positioning direction, among others, which form the basis for the positioning movement of the cutting head 20 immediately after the workpiece part 18 has been cut away.

The workpiece support 30 comprises a support surface having a plurality of support elements 31, wherein each of said support elements 31 has a plurality of support points 32 which carry the workpiece 16 placed thereon. The workpiece support 30 has a frame 24. This can rest on rollers 35 so as to be displaceable on the rack 22. The position of the workpiece support 30 relative to the zero point of the drive axes X, Y, and the positions of each of the support points 32 of the support elements 31 relative to the zero point of the drive axes X, Y are stored in the storage means 50 of the control means 60.

The cutting tool 21 includes a cutting nozzle 36 through which the cutting beam 34 emerges from the cutting tool 21. By means of the cutting beam 34, the workpiece part 18 to be cut out is cut out of the workpiece 16. In the case of laser cutting, the cutting beam 34 consists of the laser beam and the process gas beam surrounding the laser beam, for example nitrogen. The laser beam melts the workpiece 16 in the machining zone or the cutting contour 17, and the process gas beam drives out the molten material. For each workpiece part 18 to be cut out, the workpiece 16 has a cutting contour 17, which is formed in each case by a region on the workpiece 16 which delimits the workpiece part 18 to be cut out belonging to the cutting contour 17. The cutting contour 17 is formed by a set of cutting contour points 19. The cutting beam 34 is adjustable by the cutting beam control 33 so that its cutting tool parameters can be adjusted. In particular, in the case of laser cutting, the laser beam can be switched on with pinpoint accuracy at the start of the starting-cut contour 39 or at the starting-cut point 29 and, after cutting the cutting contour 17, can be switched off again with pinpoint accuracy at the cut-away point. The process gas beam is already switched on before the laser beam, and it is not turned off during the positioning movement between cutting contours 17 due to the decay time that is usually required otherwise. A machining force $F_B$, which is exerted by the cutting beam 34 on the cutting contour 17 of the workpiece part 18 of the workpiece 16 to be cut out, arises due to the high gas pressure of the process gas beam required by the cutting process, for example 10 bar or higher, which drives out not only the molten material, but also acts within a radius of a few millimetres—depending on the nozzle spacing and nozzle geometry—around the outlet axis of the cutting nozzle 36 on the workpiece part 18 to be cut out and the workpiece 16, and in particular exerts a force thereon. When cutting out the workpiece part 18 from the workpiece 16, the cutting beam 34 is guided along the cutting contour points 19 of the cutting contour 17 and separates the workpiece part 18 from the workpiece 16 in the region of the cutting contour points 19. In the cutting process, a cutting gap thus arises along the cutting contour 17 between the workpiece part 18 to be cut out and the workpiece 16, wherein the cutting gap has approximately the width of the cutting beam 34. In the cut-away point 129, the cutting contour 17 closes, and the aforementioned machining force $F_B$ acts, depending on the immediately following positioning movement, more strongly or weakly, as well as longer or shorter, on the now cut-away workpiece part 18. This can thereby tilt, depending on the support stability or tilt stability.

The cutting tool parameters mentioned do not include the cutting gas pressure, the nozzle spacing, the nozzle diameter and the nozzle shape.

The beam cutting device 15 comprises a control means 60 which includes the cutting beam control 33 and the drive control 26. Furthermore, the beam cutting device 15 comprises a storage means (50) which stores at least the coordinates ($x_A$, $y_A$) of at least one starting-cut point (29). Alternatively or additionally, the storage means (50) stores at least the coordinates ($x_F$, $y_F$) of at least one cut-away point (129).

The beam cutting device 15 can have a detection means 27 for detecting the workpiece 16, the workpiece part 18 and/or the workpiece support 30, advantageously for determining the position of the workpiece support 30 relative to the workpiece 16, and in the preferred embodiment is an optical detector, for example a camera or a simple photodetector. In an alternative or additional embodiment (not shown) the detection means 27 can also be a contactless distance-measuring means or be replaced by at least one mechanical stop for the workpiece 16 (not shown) on which the workpiece 16 can be struck in the X and/or Y direction.

Figure 4:
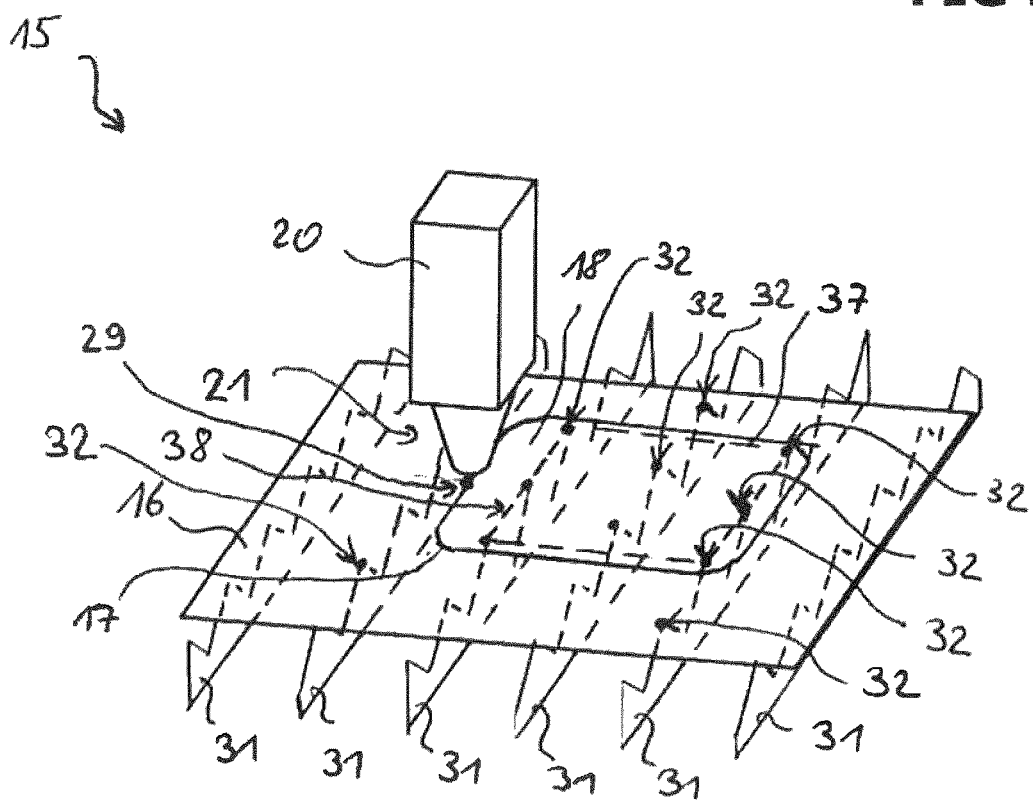
FIG. 4 shows a perspective view of the cutting head of the beam cutting device and the workpiece support together with the workpiece and workpiece part according to FIG. 3.

The workpiece 16 or cutting object to be processed, in this case, is largely plate-like and made of metal, wherein the workpiece 16 can also have a different shape and can consist of another material, such as plastic or an alloy. The workpiece 16 and the workpiece part 18 to be cut out rest on the support points 32 of the support elements 31 with a surface opposite the cutting tool 21, either point by point or section by section. The workpiece part 18 to be cut out contacts those support points 32 which are arranged within the workpiece part 18 to be cut out. Depending on the position of the support points 32 within the workpiece part 18 to be cut out, the support stability of the workpiece part 18 to be cut out on the workpiece support 30 is defined, which additionally depends on the centre of gravity $S_P$ of the workpiece part 18 to be cut out and the weight force $F_S$ acting thereon. By virtue of the virtual connection of those support points 32 which lie closest to the cutting contour 17 of the workpiece part 18 to be cut out, the convex support polygon 37 can be defined which has side lines forming the support lines 38 about which a tilting of the workpiece part 18 to be cut out would take place (FIG. 4).

Figure 5:
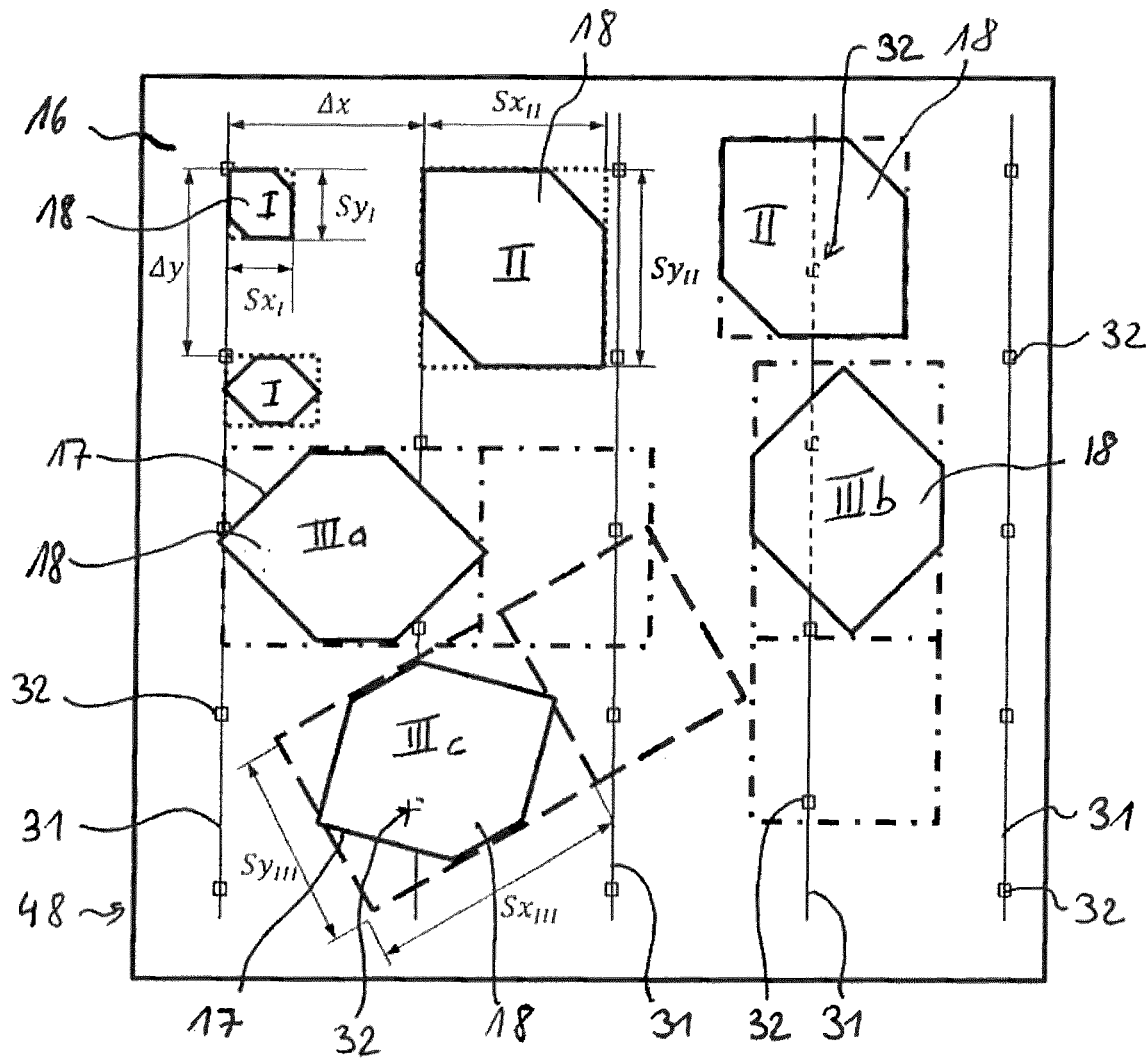
FIG. 5 shows a detailed plan view of a cutting plan of the workpiece with the workpiece parts to be cut out with different contour sizes on the workpiece support.
Figure 6:
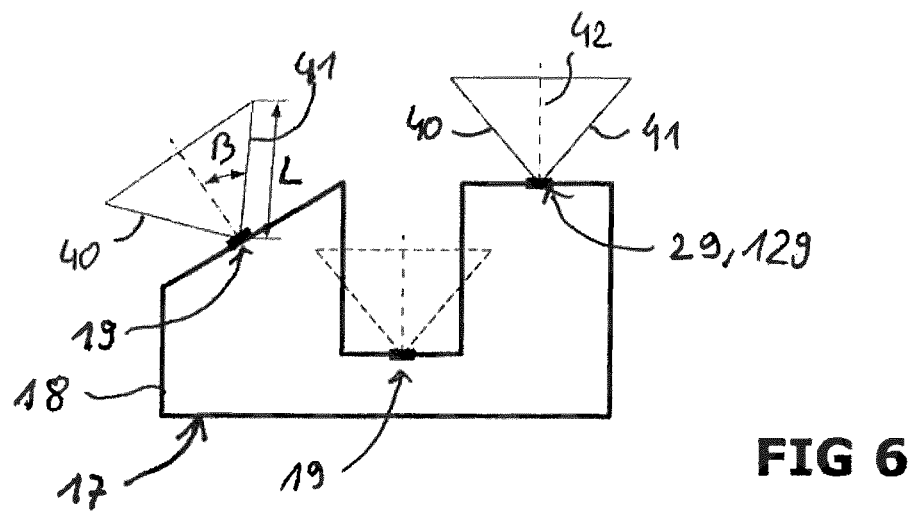
FIG. 6 shows a detailed plan view of a geometry of the cutting contour of a workpiece part to be cut out of the workpiece according to the preceding figures.
Figure 7:
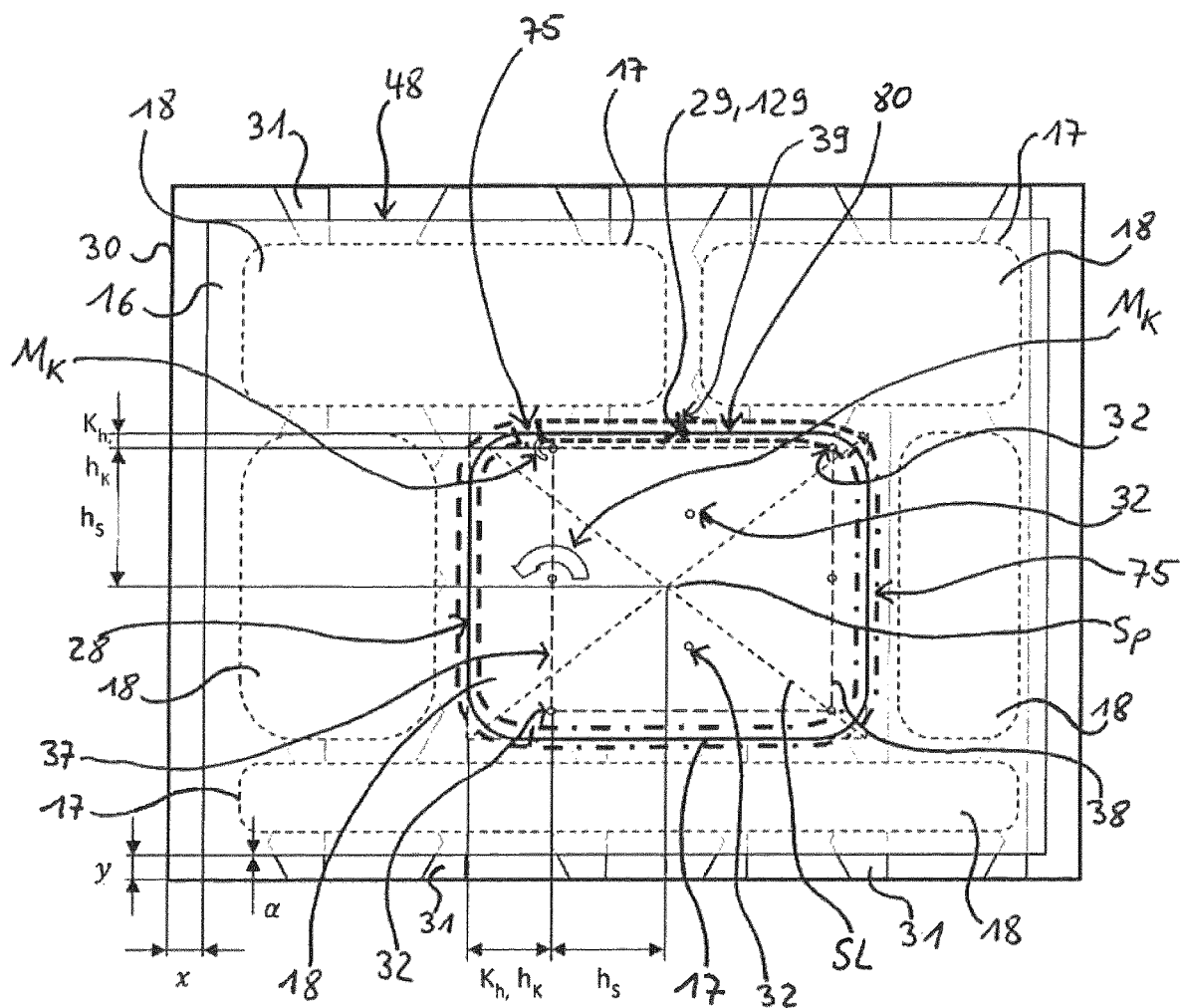
FIG. 7 shows a detailed plan view of a workpiece with a plurality of workpiece parts on the workpiece support according to FIG. 3 with a risk region and low-risk or risk-free regions of the cutting contour.

FIGS. 5 to 7 show the workpiece 16 with a plurality of workpiece parts 18 to be cut out using the cutting tool 21. In this case, the workpiece parts 18 to be cut out have different sizes and define the cutting plan 48. The workpiece parts 18 to be cut out each have a cutting contour 17 and lie on the support points 32 of the workpiece elements 31 of the beam cutting device 15. Naturally, for the sake of simplicity, the cutting contours 17 of the illustrated workpiece parts 18 only have a very simple shape. The method according to the invention can be applied to any workpiece part or cutting contour shapes. In particular, workpiece parts 18 are also possible which have one or more holes or cut-outs of any size and shape, wherein the starting-cut or cut-away points (29, 129) of these holes or cut-outs themselves are again optimised by means of the method according to the invention and can be selected in a non-tilting manner. The cutting contour 17 can, depending on the existing tilting stability when cutting away the workpiece part 18 to be cut out, be divided into regions of different tilting risk. For example, there may be a risk region 28, a low-risk region 75 and a risk-free region 80 in the cutting contour 17. In the risk region 28, there is an almost 100 percent risk of tilting if the workpiece is cut away in this risk region 30. In the risk-free region 80, on the other hand, there is no risk that the workpiece part 18 will tilt when it is cut away in this risk-free region 80.

The support elements 31 are spaced in one dimension with the distance $\Delta x$. The support points 32 are spaced along the support elements 31 in a further dimension with the distance $\Delta y$. The workpiece parts 18 to be cut out can be classified into classes according to their contour size, the workpiece parts 18 to be cut out being surrounded by the smallest possible rectangles, which are parallel to the axis or not parallel to the axis. The surface areas of the rectangles are defined using their side lengths $Sx_i$ and $Sy_i$. Those workpiece parts 18 to be cut out which can be surrounded by the smallest rectangle with side lengths $Sx_I$ and $Sy_I$ are assigned to contour size class I. In this case, those workpiece parts 18 to be cut out are assigned to the contour size class I, which in the two dimensions or side lengths $Sx_I$ and $Sy_I$ are smaller than a defined or parameterisable fraction of the grid dimensions of the workpiece support, i.e. the distances $\Delta x$ and $\Delta y$. Those workpiece parts 18 to be cut out which cannot be surrounded by the smallest rectangle with its side lengths $Sx_I$ and $Sy_I$ are surrounded by a rectangle of larger surface area and thus assigned to the next larger contour size class II. The side lengths $Sx_{II}$ and $Sy_{II}$ are again defined by a parameterisable fraction of the distances $\Delta x$ and $\Delta y$. Those workpiece parts 18 to be cut out which cannot be surrounded by the two previously defined rectangles are assigned to the next largest contour size class III with the side lengths $Sx_{III}$ and $Sy_{III}$. Any number of contour size classes is conceivable. In addition, within the contour size classes, those workpiece parts 18 to be cut out have to be distinguished which are surrounded, for example, by a rectangle IIIa and IIIb parallel to the axis, as well as those workpiece parts 18 to be cut out which are surrounded by a rectangle IIIc not parallel to the axis. This makes it possible to estimate the tilting behaviour heuristically without further steps of the method according to the invention, in particular without knowledge of the actual support situation and determination of a risk region. Depending on the contour size class, it is also possible to set automatic microbridges 43 in the cutting contour 17 or to carry out a cutting of larger holes or cut-outs. Advantageously, all workpiece parts 18 classified into the contour size class I which fall through the workpiece support with absolute certainty after being cut away are excluded from the method steps b) to e) according to the invention, which hugely reduces the required calculation time.

As shown in FIG. 6, the selection of the starting-cut point 29 or the cut-away point 129 for the cutting tool 21 on the cutting contour 17 of the workpiece part 18 to be cut out depends on the geometry of the cutting contour 17 and is determined by means of the selection straight lines 40 and 41 which are inclined with respect to the cutting contour point normal 42 by the selection angle β. In this case, the intersection of the selection straight line 41 with a further cutting contour point 19 adjacent to the cutting contour point 19 leads to an elimination of the cutting contour point as a starting-cut point 29 or cut-away point 129. In this case, the selection straight lines 40 and 41 or the selection angle β are determined by a cutting tool parameter, for example, by the outflow cone angle or by the hopping angle in the case of fly positioning and are dependent on the cutting nozzle type on the cutting tool 21. The selection straight lines 40 and 41 shown are part of an isosceles triangle, wherein the length L of the selection straight 40 and 41 represents the effective region of the cutting beam 34 of the cutting tool 21.

Figure 8:
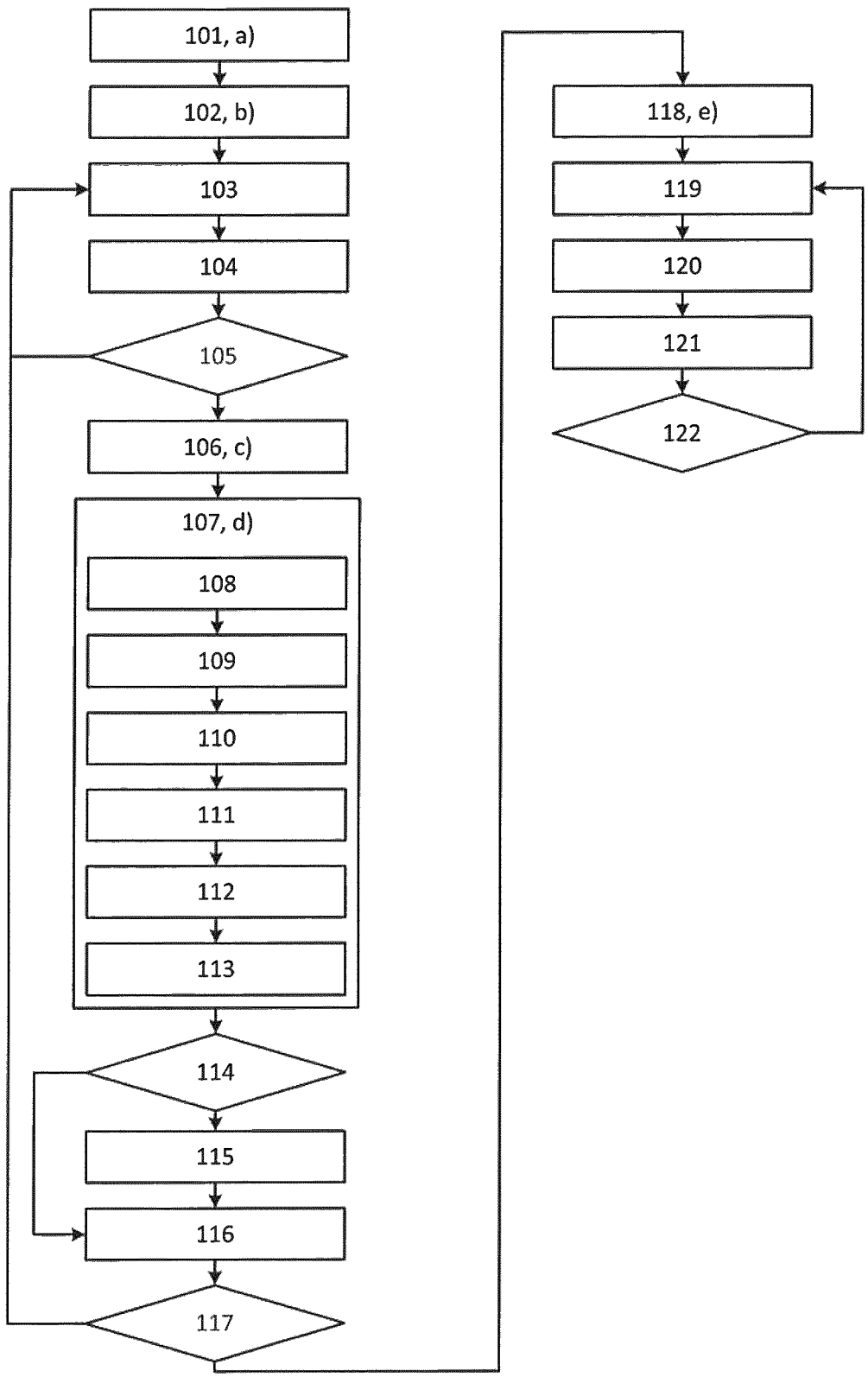
FIG. 8 shows a flow chart of a first embodiment of the method according to the invention.
Figure 11:
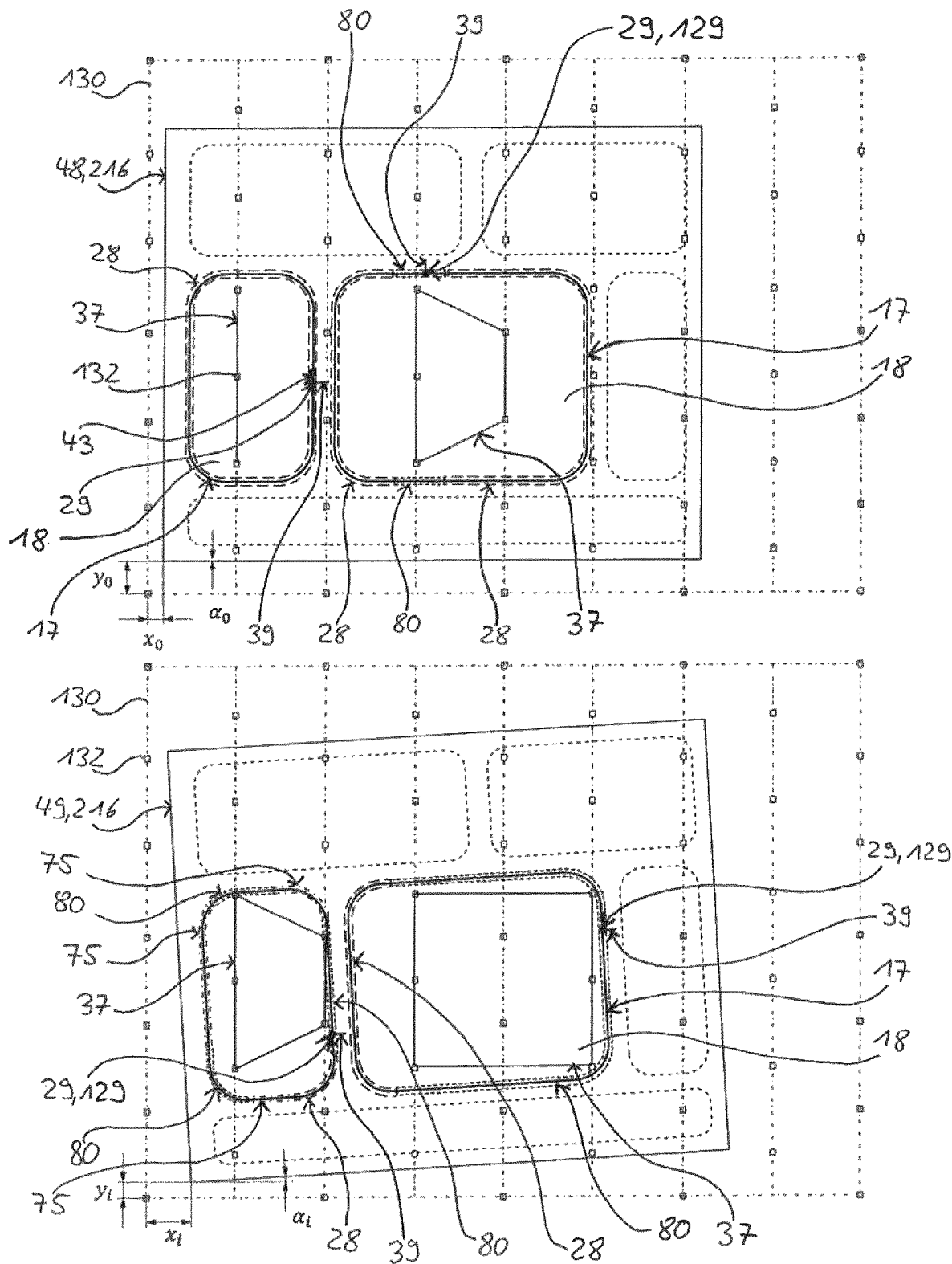
FIG. 11 shows two cutting plans of a set of cutting plans with a virtual workpiece support according to the computer-implemented method according to the invention.

A first embodiment of the method according to the invention is described with reference to FIG. 7 and the support situation of the centrally arranged workpiece part 18 to be cut out in the workpiece 16 using the above-described cutting tool 21 of the beam cutting device 15 and shown in the flow chart in FIG. 8. Furthermore, examples of different support situations of workpiece parts 18 are shown by FIG. 11.

In a first step 101, at least one cutting plan 48 for the workpiece 16 having at least one cutting contour 17 for at least one workpiece part 18 to be cut out of the workpiece 16 is specified (according to step a)).

Subsequently, in the second step 102, the relative position x, y and/or orientation α of the workpiece 16 or of the workpiece part 18 to be cut out is determined with respect to the workpiece support 30 (according to step b)). The relative position of the workpiece 16 or of the workpiece part 18 to be cut out is determined with respect to the workpiece support 30 using the detection means 27. The detection means 27 detects, for example, an edge of the workpiece 16. Alternatively or additionally, step 102 takes place by means of at least one mechanical stop on the workpiece support 30.

Subsequently, in step 103, the contour size of a first workpiece part 18 to be cut out is defined, wherein the workpiece part 18 to be cut out is enclosed in each case by a rectangle parallel to the axis or a rectangle which is smallest in area and not parallel to the axis.

Subsequently, in step 104, the workpiece part 18 is assigned to a previously defined, parameterisable contour size class I to III by means of the previously defined contour size of the workpiece part 18 to be cut out. The previously defined contour size classes I to III subdivide the workpiece parts 18 to be cut out into those workpiece parts 18 which must be taken into account in the following risk region determination (contour size classes II to III) and those which are disregarded by the following risk region determination (contour size class I). Thus, those workpiece parts to be cut out which, owing to their workpiece part 18 size, automatically fall through the space between the support elements 31 when cut away are not taken into account. Other contour size classes, for example contour size class IV, are not excluded, depending on the cutting plan 48.

If the workpiece part 18 to be cut out of the workpiece 16 is assigned to the contour size class I, steps 103 and 104 are repeated until a workpiece part 18 to be cut out has been selected on the cutting plan 48 which has been assigned to a contour size class II or higher (step 105).

Subsequently, in step 106, relative positions of the support points 32 of the workpiece support 30 below the workpiece part to be cut out 18 are determined (according to step c)).

Subsequently, in step 107, risk regions 28 on the cutting contour 17 of the workpiece part 18 to be cut out are determined. In these risk regions 28, when the workpiece part is cut away, tilting of the workpiece part 18 to be cut out is very likely (according to step d)).

To determine risk regions 28, either a mechanical calculation can be carried out, as described in the following sub-steps 108-113, or alternatively simple search methods can be carried out, which are carried out below in a third embodiment of the method according to the invention with reference to FIG. 12. The mechanical calculation allows a very accurate determination of the actual expected tilting behaviour.

In order to determine risk regions 28 on the basis of the mechanical calculation, at least one machining force $F_B$ which is dependent on cutting parameters of the cutting tool 21 is determined in a first sub-step 108. The cutting parameters comprise one or more cutting tool parameters and/or positioning parameters. Advantageously, depending on at least one cutting parameter, in particular positioning parameters, at least one minimum and one maximum machining force $F_{B,min}$, $F_{B,max}$ are defined which can act on the workpiece part 18 at the time of cutting away, depending on the adjustment values of the cutting parameters.

Alternatively, the machining force $F_B$ is additionally defined at a cutting contour point of the cutting contour 17 which is adjacent to the cutting contour point 19.

Subsequently, in sub-step 109, the centre of gravity $S_P$ of the workpiece part 18 to be cut out is determined as a workpiece part parameter. Alternatively, one or more lines of gravity $S_L$ could be determined.

In a further sub-step 110, support lines 38 of the support polygon 37 are subsequently defined as polygon parameters within the workpiece part 18 to be cut out, and the number of corner points of the support polygon 37 are defined as polygon parameters. In the process, those support points 32 within the workpiece part 18 to be cut out are virtually connected to one another which are closest to the cutting contour 17, or the convex comprehensive polygon 37 of all support points 32 is formed which lie within the considered workpiece part 18 to be cut out.

In a further sub-step 111, a permissible force $F_Z$ is defined at a plurality of cutting contour points 19 of the cutting contour 17 of the workpiece part 18 to be cut out, wherein the permissible force $F_Z$ is the force which, if exerted on the corresponding cutting contour point 19, would lead to tilting of the workpiece part 18 about the associated support line 38. Advantageously, the permissible force is calculated for a uniformly spaced subset of cutting contour points 19 of the cutting contour 17, for example, which are close together in pairs. The permissible force $F_Z$ is defined from the static moment equation for each of the support lines 38 defined for this cutting contour point 19 as follows:

$$F_Z = F_S \frac{h_S}{h_K}, \quad \text{(Equation 1)}$$

wherein $F_S$ is the weight force at the centre of gravity $S_P$ of the workpiece part 18 to be cut out, $h_S$ is the distance from the support line 38 to the centre of gravity $S_P$ and $h_K$ is the distance from the support line 38 to the cutting contour point 19 of the cutting contour 17. The latter distance $h_K$ is also referred to as a rocker arm $K_h$. The final permissible force $F_Z$ valid at the cutting contour point 19 is defined as the minimum of all permissible forces $F_Z$ calculated with different support lines 38.

Subsequently, in a further sub-step 112 for the cutting contour point 19 of the cutting contour 17, a force comparison of the permissible force $F_Z$ takes place with the previously defined machining force $F_B$ at the cutting contour point 19 of the cutting contour 17 of the workpiece part 18 to be cut out In the force comparison, subsets of cutting contour points 19 of the cutting contour 17 are selected, for example a low-risk region 75 for which the permissible force $F_Z$ exceeds at least a minimum tilting force limit value, for example a minimum machining force $F_{B,min}$, and/or a risk-free region 80 of cutting contour points of the cutting contour for which the permissible force exceeds at least a maximum tilting force limit value, for example, the maximum machining force $F_{B,max}$. Those cutting contour points 19 for which the permissible force $F_Z$ itself does not exceed the minimum tilting force limit value form the risk region or regions 28 in which no cut-away point 129 may later be defined or no cutting away may occur.

In a further sub-step 113, the previously defined low-risk regions 75 of cutting contour points 19 and/or risk-free regions 80 are further restricted by excluding certain contour regions because of unfavourable contour geometry. Unfavourable contour regions are present, for example, in the case of narrow concave contour regions, or if the cutting contour 17 is clearly concave in the effective region of the cutting beam 34. In general, a contour region is unfavourable for the placement of a starting-cut or cut-away point if, as a result of the positioning movement, the cut-away workpiece part 18 remains significantly longer in the interaction region of the cutting beam 34 than would be the case for a straight contour region. Unfavourable contour regions can be excluded using the method according to FIG. 6 (selection straight lines 40, 41) or by means of a cutting contour curvature averaged over a plurality of cutting contour points 19 of the cutting contour 17, or by means of a positive and negative cutting contour curvature averaged in the radius of the effective region 34 of a cutting tool parameter, for example the cutting gas pressure.

At each cutting contour point 19 of these now restricted regions, a starting-cut point 29 or a cut-away point 129 can later be defined; in the restricted risk-free regions, a cut-away point 129 or a starting-cut point 29 without any conditions for the cutting parameters, in particular positioning parameters, including with such cutting parameters or positioning parameters which produce a maximum machining force F B,max; in the restricted low-risk regions, a cut-away point 129 or starting-cut point 29 with positioning parameters of the cutting tool which produce a minimum machining force $F_{B,min}$ or at least a significantly lower machining force than the maximum machining force $F_{B,max}$.

In a further step 114, it is checked whether the workpiece part 18 can be cut out of the workpiece 16 without tilting.

If this is not the case, since in particular the risk region 28 encompasses the entire cutting contour 17 (as shown by the left-hand workpiece part in the upper cutting plan in FIG. 11), in a further step 115 either a repositioning of the workpiece part 18 is undertaken, wherein after its repositioning steps 106 to 113 are repeated (either immediately after or after previous processing of all other workpiece parts 18 of the workpiece 16), or a microbridge 43 is set on the workpiece part 18 to be cut out (as shown by the left workpiece part in the upper cutting plan in FIG. 11). Both measures in step 115 later enable a non-tilting cutting of the workpiece part 18. Alternatively, the workpiece 16 can be repositioned, or at least one of the support points 32 which lies within the workpiece 16 is repositioned.

Subsequently, in step 116, the coordinates $x_A$, $y_A$ of all now defined possible starting-cut points 29 or coordinates $x_F$, $y_F$ of the defined possible cut-away points 129 of the workpiece part 18 to be cut out are stored in a storage means 50 of the cutting device 15 or an external storage means 250. Preferably, all the low-risk regions 75 restricted in step 113 and all restricted risk-free regions 80 of the workpiece part 18 to be cut out are stored.

The steps 103 to 116 are repeated until all workpiece parts 18 of the workpiece 16 have been processed (step 117).

Subsequently, in step 118 (step e)), one or at least one starting-cut point 29 and/or one cut-away point 129 for the cutting tool 21 on the cutting contour 17 of the at least one workpiece part 18 to be cut out is defined by taking into account the at least one identified risk region 28 on the cutting contour 17 of the at least one workpiece part 18 to be cut out. Preferably, a sequence of at least two starting-cut points 29 and/or cut-away points 129 for the cutting tool 21 on the cutting contours 17 of at least two workpiece parts 18 to be successively cut out in the sequence is defined by taking into account more than one identified risk region 28 on the cutting contours 17 of the at least two workpiece parts 18 to be cut out successively. The workpieces to be successively cut out are arranged preferably adjacent to one another or side by side. The workpiece parts 18 are selected such that the intermediate positioning path is free of cut workpiece parts. This means that no already cut workpiece parts 18 are passed over on the intermediate positioning path.

Preferably, all of the stored starting-cut points 29 or cut-away points 129 of the workpiece parts 18 to be cut out are lined up on the workpiece 16 to optimise the cutting sequence and the positioning path of the cutting tool 21 on the workpiece 16, and the optimum starting-cut point and/or cut-away point are/is selected with respect to the identified risk region as explained below. In the process, these defined starting-cut points 29 or cut-away points 129 of the workpiece parts 18 to be cut out are lined up on the workpiece 16 in such a way that in the following cutting process no workpiece parts already cut out of the workpiece 16 are disposed in the positioning path of the cutting tool 21 and the positioning path is reduced.

Thus, in this step 118, an optimisation routine for the cutting sequence and the positioning path from all the cutting contour regions of the, possibly restricted, low-risk and risk-free regions 75, 80 for each cutting contour 17 of each workpiece part 18 can select a defined starting-cut point 29 (step e)) such that an optimal cutting sequence and a minimal positioning path can be enabled without workpiece parts immediately tilting when cut away or during the subsequent positioning movement.

Subsequently, in step 119, a cutting process is carried out using the cutting tool 21 and with adequate cutting tool parameters for the workpiece 16 to be machined, which cutting process starts or opens at the now defined starting-cut point 29 of the first workpiece part to be cut out, is guided along the cutting contour 17 and, if no microbridge 43 is provided because of a lack of tilting stability, ends at the correspondingly identical cutting contour point, the cut-away point 129.

Subsequently, in step 120, immediately after the workpiece part 18 is cut away, a positioning movement is carried out with the cutting head 20 away from the cut-away point 129. If the cut-away is made in a low-risk cutting contour region 75, the corresponding gentle three-axis positioning method is carried out with the corresponding positioning parameters. If the cut-away is made in a risk-free cutting contour region 80, the biaxial positioning method can also be carried out. The choice of the appropriate positioning method with the appropriate positioning parameters by the control means 60 away from the cut-away point 129 guarantees that the machining force $F_B$ or minimum machining force $F_{B,min}$ or maximum machining force $F_{B,max}$ calculated in step 108 is not exceeded.

If the workpiece 16 has a plurality of workpiece parts 18 to be cut out, the next starting-cut point 29 in line and thus the next workpiece part 18 in line are approached by the cutting head 20 in a further step 121.

The steps 119 to 121 are repeated until all the workpiece parts 18 to be cut out are cut out of the workpiece 16 (step 122).

The previously disclosed method steps and elements are imaged in a virtual space in a second embodiment, wherein, for example, the workpiece support 30 with all support points 32 is virtual and the at least one cutting plan 48 has at least one piece of information on the position and/or orientation of the virtual workpiece support 130 relative to the virtual workpiece 216, wherein the dimensions of the actual workpiece 16 to be used later are understood by the virtual workpiece 216, which is identical to the dimensions of the workpiece panel, shown in the cutting plan 48.

Figure 9:
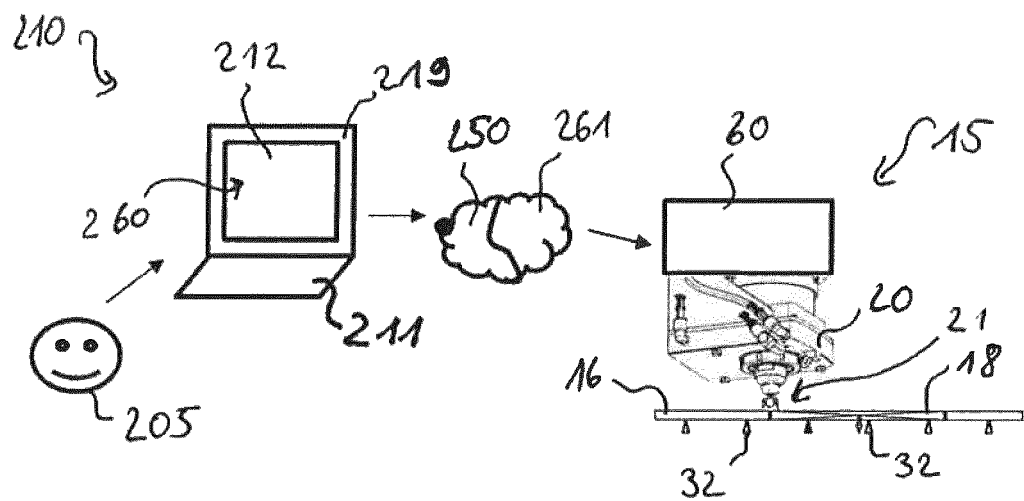
FIG. 9 shows a simple graphical representation of the computer-implemented method according to the invention as a second embodiment.
Figure 10:
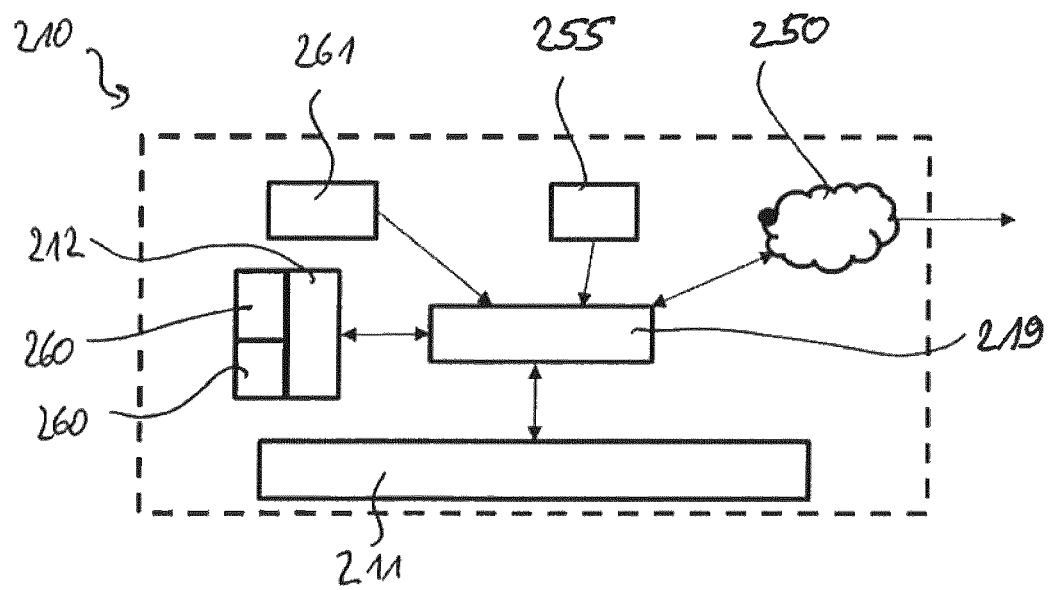
FIG. 10 shows a computer according to FIG. 9 for carrying out the computer-implemented method.

Thus, as shown in FIGS. 9-11, the previously disclosed method according to the invention can be represented and carried out as a computer-implemented method for automatically defining and generating geometric elements and/or movement commands to control the cutting tool 21 and cutting head 20 of a beam cutting device 15. For this purpose, a computer 210 having an input means 211 and a computer processor 219 is provided. The computer 210 is arranged directly on or spaced apart from the beam cutting device 15 and can be connected thereto. In particular, the computer 210 can be integrated with the beam cutting device 15, or the control software of one or more components of the control means 60 can be partially integrated with the computer 210. However, the computer 210 can also carry out the computer-implemented method independently of the beam cutting device.

The computer 210 includes a software package 212 having a plurality of software applications 260 and automation software 261 which are executed in the computer processor 219. Alternatively, as shown in FIG. 9, automation software 261 can be executed as a cloud service. The virtual steps of the method according to the invention are implemented in the automation software 261 as a computer-implemented method. In this case, the virtual steps for optimising the starting-cut points 29 and the cutting sequence of the workpiece parts 18 of the workpiece 16, 216 and the cutting plan 48 can be implemented purely on the geometry plane by generating and/or moving geometric elements of the starting-cut contours 39, or at the same time movement commands for the cutting tool 21 can be generated.

According to step a), the user 205 can create a cutting plan 48 with geometric elements and/or movement commands for the cutting tool 21. For this purpose, the user 205 uses a suitable software application 260, for example a computer-aided design (CAD) program. The cutting plan 48 is stored in the computer 210 and in a storage means 250 arranged therein or in an external storage means 250. Alternatively, the cutting plan 48 can be loaded from an external storage means 250 without the user 205 explicitly creating it.

In a first phase, the method according to the invention for optimising one or more cutting plans which is implemented in the automation software proceeds according to steps b) and c) as follows:

The automation software 261 in the computer 210 receives a virtual workpiece support 130 stored in a workpiece support library 255 of the computer 210. The virtual workpiece support 130 defines the plurality of support points 132, which has the actual workpiece support 30. In addition, the automation software 261 receives the information about the relative position $x_0$, $y_0$ and/or orientation $\alpha_0$ that belongs to the cutting plan 48. This information comes either from the control means 60 which was detected in this case by means of the detection means 27 on the real workpiece 16, i.e. the actual relative position x, y and/or orientation α, or in the virtual case it is itself specified by the automation software 261 as an initial zero position.

Optionally, the automation software initialises a set of cutting plans 48, 49 with at least one further cutting plan 49, wherein the relative position $x_i$, $y_i$ and/or orientation $\alpha_i$ of the virtual workpiece support 130 in each cutting plan 48, 49 of the set differ and are offset in the x and y direction, and can also be twisted in orientation. Preferably, the cutting plans 49 of the set contain the same workpiece parts 18 as the cutting plan 48, in particular also the same arrangement of the workpiece parts 18, optionally by taking into account any risk regions which arise from the changed position of the virtual workpiece support relative to the virtual workpiece.

In a second phase, subsequently, the automation software 261 for the cutting plan 48 or the further cutting plans 49 of the cutting set carries out the steps according to the invention in a purely virtual manner, which are shown by way of example with the steps 103 to 118 (according to FIG. 8). In this case, the finally optimised cutting plan 48 or the set of finally optimised cutting plans 48, 49 are stored in the storage means 250 and transferred immediately afterwards or later to the storage means 50. This completes the computer-implemented method.

In a third phase, the real machining process then takes place on the beam cutting device 15, wherein either the one optimised cutting plan 48 is processed directly by the control means 60, or, in the case of a set of optimised cutting plans, the actual relative position x, y and/or orientation α of the workpiece 16 with respect to the workpiece support 30 is first detected by means of the detection means 27, then a suitable cutting plan 49 is selected and then the machining process is performed on the beam cutting device 15 according to the selected cutting plan 49 and the corresponding movement commands.

In the process, the cutting plan 48, 49 is selected from the set of cutting plans 48, 49 which has the greatest match of the at least one piece of information on the position $x_i$, $y_i$ and/or orientation α, of the at least one workpiece part (18) to be cut out relative to the virtual workpiece support 130 with the actual position x, y and/or actual orientation α of the workpiece support 30 of the beam cutting device 15. The cutting plan 48 can be further optimised with respect to the actual position x, y and/or actual orientation α of the workpiece support 30 relative to the workpiece 16 in that at least the risk regions 28 are defined again by means of the automation software 261 and, if they differ, the starting-cut points and/or cut-away points are reset.

Figure 12:
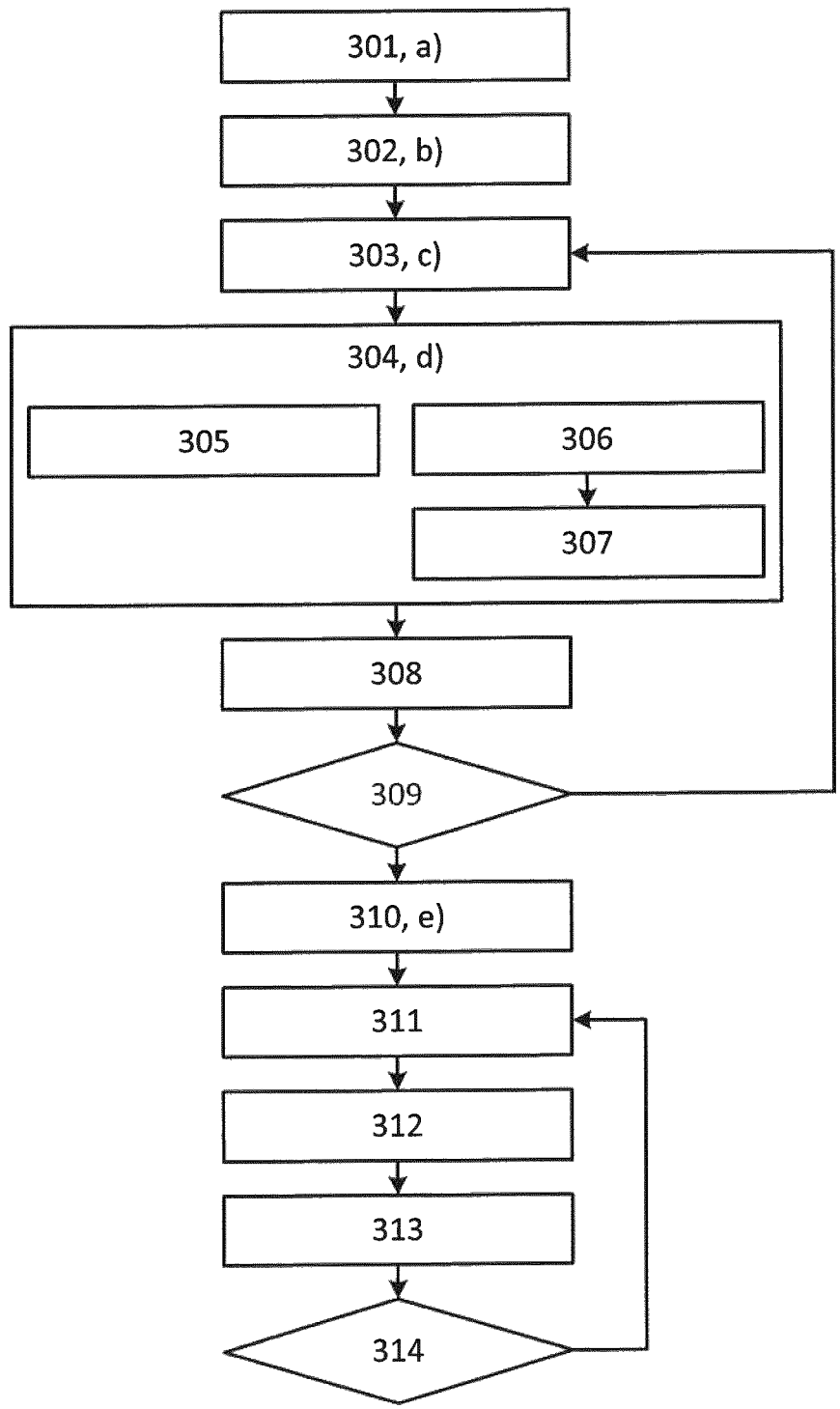
FIG. 12 shows a flow chart of a third, simplified embodiment of the method according to the invention.
Figure 13:
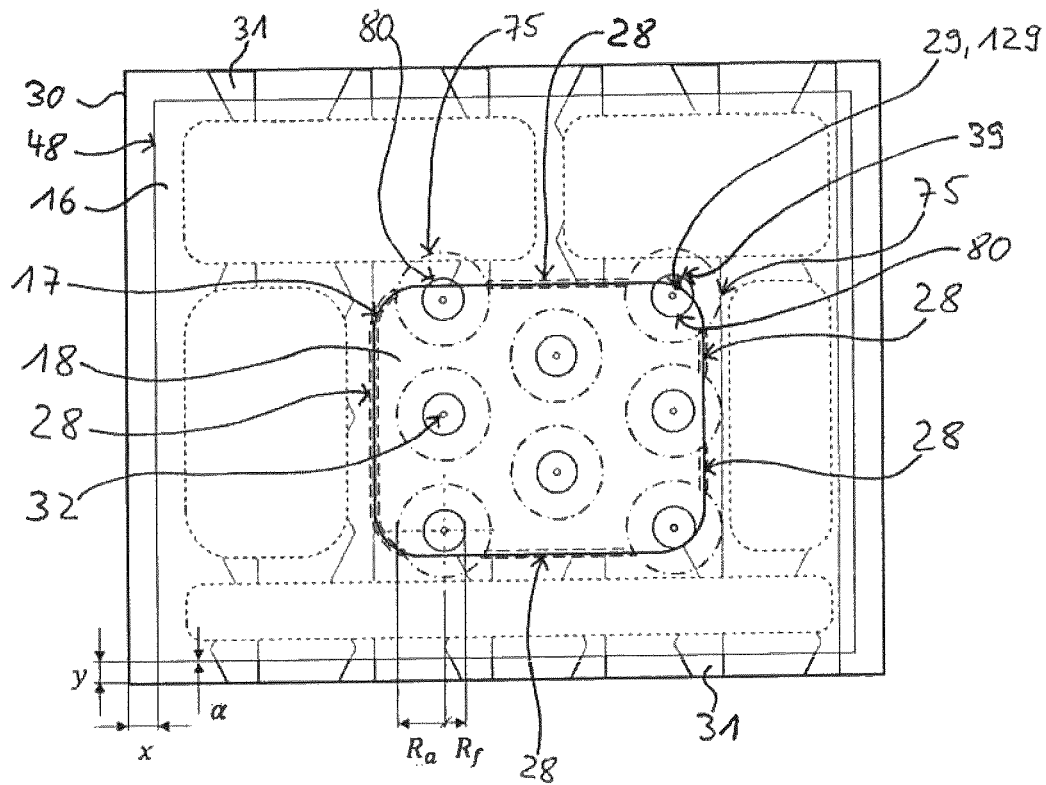
FIG. 13 shows a workpiece having a plurality of workpiece parts and simple search regions to illustrate the simplified embodiment of the method.
Figure 13:
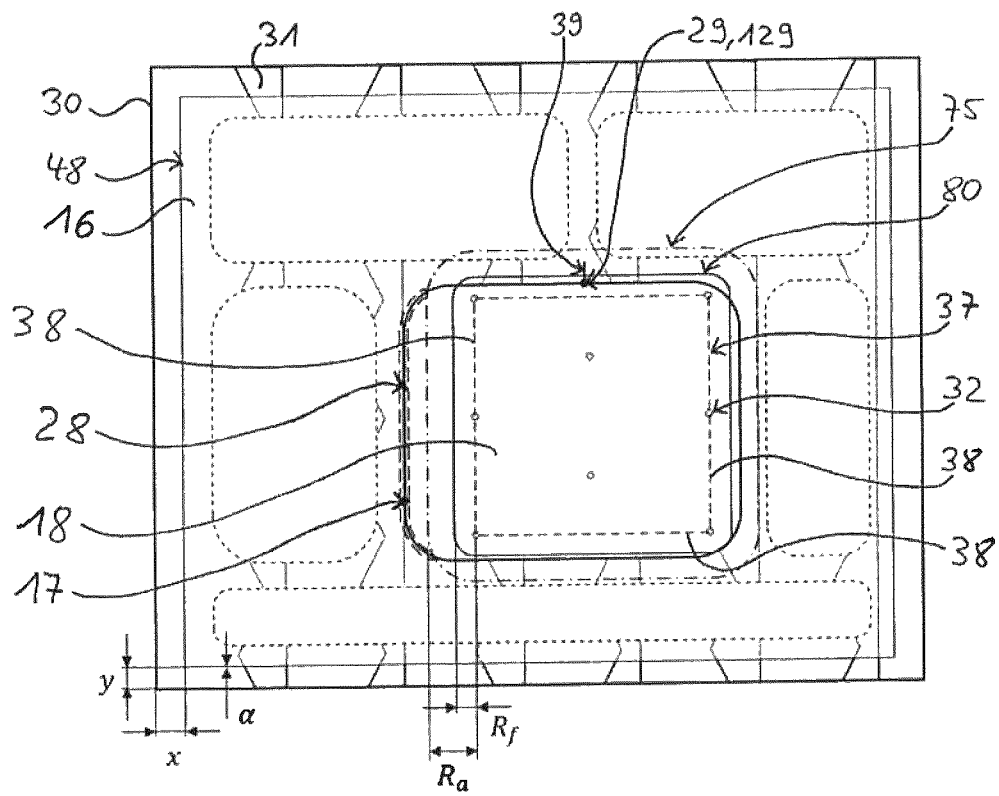

A third embodiment of the method according to the invention is illustrated in FIG. 13 and in the flow chart according to FIG. 12. The main difference to the first embodiment is that risk regions 28 of the cutting contour 17 of the at least one workpiece part 18 are defined by means of simple search methods. As a result, fewer computing operations are needed.

In a first step 301 (according to step a)), at least one cutting plan 48 for the at least one workpiece part 18 to be cut out from the workpiece 16 is specified.

Subsequently, in step 302 (according to step b)), the relative position x, y and/or orientation α of the workpiece 16 with respect to the workpiece support 30 is determined, wherein the relative position and orientation are determined by means of the detection means 27 and/or at least a mechanical stop on the workpiece support 30.

Subsequently, in step 303 (according to step c)), each of the support points 32 of the workpiece support 30 which are arranged below the at least one workpiece part 18 and their relative positions are determined.

In a further step 304 (according to step d)), risk regions 28 on the cutting contour 17 of the workpiece part 18 to be cut out are determined. In these risk regions 28, tilting of the workpiece part 18 to be cut out is very likely during cutting away.

In the first sub-step 305, a simple search of cutting contour points 19 of the cutting contour 17 in the vicinity of the support points 32 located below the workpiece 18 is carried out (illustrated in FIG. 13a). If cutting contour points 17 lie within circles with a radius $R_f$, they are classified into risk-free cutting contour regions 80 in which later a starting-cut point 29 or cut-away point 129 can be defined at which a cut-away can take place without conditions, i.e. with any positioning movement, in particular a biaxial positioning movement with maximum machining force $F_{B,max}$. If there are further cutting contour points 19 within circles with a radius $R_a$, these are classified into low-risk cutting contour regions 75 in which a starting-cut point 29 or cut-away point 129 can later be defined at which a cut-away takes place with conditions, i.e. in particular a three-axis positioning movement with minimum machining force $F_{B,min}$. Further circles with radii between $R_f$ and $R_a$ can be defined to form further intermediate cutting contour regions which represent or enable gradations of machining forces or positioning movements with other positioning parameters after the cut-away. All cutting contour points 19 of the cutting contour 17 not yet classified belong to the risk region 28 or to the risk regions 28 at which no starting-cut point 29 or cut-away point 129 is later allowed to be defined.

Alternatively, in a first sub-step 306, the support polygon 37 is defined as a convex comprehensive polygon of all support points 32 which lie within the considered workpiece part 18 to be cut out. The support polygon 37 in this case has a plurality of support lines 38 as connecting sections of the corner points of the support polygon 37, wherein a tilting of the workpiece 18 could occur about these support lines 38 after the cut-away.

Subsequently, in sub-step 307, as an alternative to sub-step 305, a simple search of cutting contour points 19 of the cutting contour 17 in the vicinity of the previously defined support lines 38 is carried out (illustrated in FIG. 13b).

If cutting contour points lie within a contour which is created by expanding the support polygon 37 by the radius $R_f$, these are classified into risk-free cutting contour regions 80. If cutting contour points 19 lie within a contour which is created by expanding the support polygon 37 by the radius $R_a$, these are classified into low-risk cutting contour regions 75. The same applies as in sub-step 305 for defining further intermediate cutting contour regions and the corresponding subsequent defining of starting-cut points 29 or cut-away points 129 by taking into account the determined cutting contour regions. All cutting contour points 19 of the cutting contour 17 not yet classified belong to the risk region 28 or to the risk regions 28 at which no starting-cut point 29 or cut-away point 129 is later allowed to be defined.

The cutting contour regions determined in this step 304 neither require machining forces to be defined, nor a calculation of permissible forces on the cutting contour 17 of the workpiece part 18, which allows the method to be carried out particularly simply.

Subsequently, in step 308, the coordinates $x_A$, $y_A$ of all now defined possible starting-cut points 29 or coordinates $x_F$, $y_F$ of the determined possible cut-away points 129 of the workpiece part 18 to be cut out are stored in a storage means 50 of the cutting device 15 or an external storage means 250. These are all possible starting-cut points 29 or cut-away points 129 in the previously defined low-risk and risk-free cutting contour regions 75, 80 of the cutting contour 17.

The steps 303 to 308 are repeated until all workpiece parts 18 of the workpiece 16 have been processed (step 309).

Subsequently, in step 310 (step e)), one or at least one starting-cut point 29 and/or one cut-away point 129 for the cutting tool 21 on the cutting contour 17 of the at least one workpiece part 18 to be cut out is defined by taking into account the at least one identified risk region 28 on the cutting contour 17 of the at least one workpiece part 18 to be cut out. Preferably, all of the stored starting-cut points 29 or cut-away points 129 of the workpiece parts 18 to be cut out are lined up on the workpiece 16 to optimise the cutting sequence and the positioning path of the cutting tool 21 on the workpiece 16, and the optimum starting-cut point and/or cut-away point are/is selected with respect to the identified risk region as explained below. Thus, in this step, an optimisation routine for the cutting sequence and the positioning path from all the cutting contour regions of the low-risk and risk-free regions 75, 80 for each cutting contour 17 of each workpiece part 18 can select a defined starting-cut point 29 (step e)) such that an optimal cutting sequence and minimal positioning are made possible without workpiece parts immediately tilting when cut away or during the subsequent positioning movement.

Subsequently, in step 311, a cutting process is carried out using the cutting tool 21, which cutting process starts or opens at the now defined starting-cut point 29 of the first workpiece part to be cut out, is guided along the cutting contour 17 and ends at the correspondingly identical cutting contour point, the cut-away point 129.

Subsequently, in step 312, immediately after the workpiece part 18 is cut away, a positioning movement is carried out using the cutting head 20 away from the cut-away point 129, wherein suitable positioning parameters are used for the positioning movement immediately after the cut-away, depending on whether the cut-away point 129 is in a low-risk cutting contour region 75 or in one risk-free cutting contour area 80. This can ensure that the cut-away workpiece part 18 is not tilted.

If the workpiece 16 has a plurality of workpiece parts 18 to be cut out, the next starting-cut point 29 in line and thus the next workpiece part 18 in line are approached by the cutting head 20 in a further step 313.

The steps 311 to 313 are repeated until all the workpiece parts 18 to be cut out are cut out of the workpiece 16 (step 314).

Naturally, the third embodiment of the method according to the invention can also be represented and implemented as a computer-implemented method according to FIGS. 9 and 11, wherein the steps of the third embodiment according to FIG. 12 take place virtually before or during the actual machining process. In particular, a set of cutting plans 48, 49 can be optimised beforehand, which are later transferred to the beam cutting device 15. Before the start of the actual cutting process, step b) is first carried out, i.e. the actual position x, y and/or orientation α of the workpiece 16 with respect to the workpiece support 30 is determined.

LIST OF REFERENCE SIGNS

15 Beam cutting device
16 Workpiece
17 Cutting contour
18 Workpiece part to be cut out
19 Cutting contour point
20 Cutting head
21 Cutting tool
22 Rack of 15
23 Bridge of 15
24 Frame of 30
25 Drives
26 Drive control
27 Detection means
28 Risk region(s)
29 Starting-cut point(s)
30 Workpiece support
31 Support element(s)
32 Support point(s)
33 Cutting beam control
34 Cutting beam with conical effective region
35 Rollers
36 Cutting nozzle
37 Support polygon
38 Support lines
39 Starting-cut contour
40 Selection straight line
41 Selection straight line 42 Cutting contour point normals
43 Microbridge
48 Cutting plan
49 Further cutting plan
50 Storage means of 15
60 Control means
75 Low-risk regions of the cutting contour
80 Risk-free regions of the cutting contour
101-122 Method steps of the first embodiment
301-314 Method steps of the third embodiment
129 Cut-away point
130 Virtual workpiece support
132 Virtual support point
205 User
210 Computer
211 Input means
212 Software package
216 Virtual workpiece
219 Computer processor
250 External storage means
255 Workpiece support library
260 Software application
261 Automation software
$F_Z$ Permissible force
$F_B$ Machining force
$F_{B,min}$ Minimum machining force
$F_{B,max}$ Maximum machining force
$F_S$ Weight force
$h_k$ Distance from 38 to 19
$S_P$ Centre of gravity
$S_L$ Line of gravity
$h_S$ Distance from 38 to $S_P$
$K_h$ Rocker arm
$M_k$ Tilting moment
L Length of 40, 41
X, Y, Z Drive axes of 15
β Selection angle
$Sx_i$ First side lengths of surrounding rectangles
$Sy_i$ Second side lengths of surrounding rectangles
Δx Distance between support elements 31
Δy Distance between support points 32
$x_A$, $y_A$ Coordinates of a starting-cut point
$x_F$, $y_F$ Coordinates of a cut-away point
I-III Contour size classes
x, y Actual position of 16
α Actual orientation of 16
$x_i$, $y_i$ Virtual position of 16
$α_i$ Virtual orientation of 16
$R_f$ Radius for 80
$R_a$ Radius for 75

The invention claimed is:

1. A method for controlling a beam cutting device having a cutting tool by which at least one workpiece part can be cut out of a workpiece along a cutting contour, wherein the beam cutting device has a workpiece support comprising a plurality of support points for receiving a workpiece, and the method comprises the following steps:
  a) specifying at least one cutting plan for the workpiece having at least one cutting contour for at least one workpiece part to be cut out of the workpiece;
  b) determining a relative position and/or orientation of the workpiece and/or of the cutting plan and/or of the at least one workpiece part to be cut out with respect to the workpiece support;
  c) determining a relative position of at least one of the plurality of support points of the workpiece support, below the at least one workpiece part to be cut out;
  d) determining a plurality of cutting contour points on the cutting contour and dividing the plurality of cutting contour points into at least one risk region on the cutting contour of the at least one workpiece part to be cut out, in which, during cutting away of the at least one workpiece part to be cut out at said risk region, tilting of the at least one workpiece part is possible, at least one low-risk region having a lower risk than the at least one risk region of tilting of the at least one workpiece part, and at least one risk-free region having no risk of tilting of the at least one workpiece part; and
  e) defining, from the plurality of cutting contour points, at least one starting-cut point and/or one cut-away point for the cutting tool on the cutting contour of the at least one workpiece part to be cut out by taking into account the at least one risk region, the at least one low-risk region, and the at least one risk-free region on the cutting contour of the at least one workpiece part to be cut out; and
  wherein after step e) a cutting process with the cutting tool starting from the at least one defined starting-cut point and/or ending at the at least one defined cut-away point of the at least one workpiece part to be cut out is carried out.

2. The method according to claim 1, further comprising storing in a storage coordinates ($x_A$, $y_A$) of the at least one defined starting-cut point and/or coordinates ($x_F$, $Y_F$) of the at least one defined cut-away point.

3. The method according to claim 1, further comprising a positioning movement of a cutting head, starting from the defined cut-away point.

4. The method according to claim 1, wherein for at least one cutting contour point of the cutting contour of the at least one workpiece part to be cut out and/or at least at a cutting contour point of the cutting contour adjacent to the cutting contour point, a machining force ($F_B$) is determined which is exerted by the cutting tool on the at least one workpiece part to be cut out, wherein the machining force ($F_B$) is advantageously determined as a function of at least one cutting parameter of the cutting tool, wherein the at least one cutting parameter of the cutting tool is further advantageously at least one cutting tool parameter such as cutting gas pressure, nozzle spacing, nozzle diameter, nozzle shape, and/or wherein the at least one cutting parameter is at least one positioning parameter such as positioning speed, positioning acceleration, positioning direction, which is the basis for the positioning movement of the cutting tool after the at least one workpiece part to be cut out has been cut away.

5. The method according to claim 1, wherein after step c) at least one workpiece part parameter of the at least one workpiece part to be cut out is determined, advantageously the centre of gravity ($S_P$) or at least one line of gravity ($S_L$) of the at least one workpiece part to be cut out, and/or at least one polygon parameter of a support polygon is determined within the at least one workpiece part to be cut out, advantageously a support line of the support polygon, and then
  a permissible force ($F_Z$) is defined at at least one cutting contour point of the cutting contour of the at least one workpiece part to be cut out, advantageously at the plurality of cutting contour points of the cutting contour of the at least one workpiece part to be cut out,
  by means of the at least one workpiece part parameter and/or the at least one polygon parameter and the determined position of the at least one support point of the workpiece support below the workpiece or below the workpiece part to be cut out, or by means of the at least one workpiece part parameter and/or the at least one polygon parameter and at least one distance ($h_k$, $h_s$) of the determined position of the at least one support point of the workpiece support below the workpiece or below the at least one workpiece part to be cut out, to the at least one cutting contour point of the cutting contour of at least one workpiece part to be cut out.

6. The method according to claim 5, wherein in step d) a force comparison of the permissible force ($F_Z$) takes place with at least one previously defined tilting force limit value at at least one cutting contour point of the cutting contour of the at least one workpiece part to be cut out, wherein advantageously the force comparison takes place according to a machining force ($F_B$) at least one of the cutting contour points of the cutting contour of the at least one workpiece part to be cut out, wherein more advantageously the machining force ($F_B$) is multiplied by a safety factor.

7. The method according to claim 6, wherein in step d), on the basis of the force comparison, the at least one risk region is defined.

8. The method according to claim 7, wherein the force comparison is carried out with a minimum and/or maximum tilting force limit value, wherein this is advantageously derived from a minimum and/or maximum machining force ($F_B$).

9. The method according to claim 6, wherein in the force comparison the at least one low-risk region of the cutting contour points of the cutting contour is defined in which the permissible force ($F_Z$) exceeds at least a minimum tilting force limit value, and/or in that in the force comparison the at least one risk-free region of cutting contour points of the cutting contour is defined, in which the permissible force ($F_Z$) exceeds at least a maximum tilting force limit value.

10. The method according to claim 5, wherein after step b), a position of the at least one workpiece part parameter of the workpiece to be cut out is determined relative to a position of the at least one polygon parameter of the support polygon and/or a of the permissible force ($F_Z$) is defined and/or advantageously it is checked whether the at least on risk region determined in step d) comprises all cutting contour points of the cutting contour of the at least one workpiece part to be cut out.

11. The method according to claim 1, wherein at least one microbridge is left in the cutting contour of the at least one workpiece part to be cut out and/or at least another workpiece part to be cut out is cut up by the cutting tool.

12. The method according to claim 1, wherein the relative position and/or orientation of the workpiece and/or of the at least one workpiece part to be cut out is determined with respect to the workpiece support (step b)), and/or at least the relative position of the at least one support point of the workpiece support, below the at least one workpiece part to be cut out (step c)), is determined using at least one detection means, wherein the at least one detection means includes a sensor system of the beam cutting device, which is advantageously located on a cutting head of the beam cutting device.

13. The method according to claim 12, wherein the sensor system consists of a camera or a group of optical detectors so that advantageously at least one edge of the workpiece and/or an edge of the at least one workpiece part to be cut out is detected.

14. The method according to claim 1, wherein the relative position and/or orientation of the workpiece with respect to the workpiece support is determined (step b)) by means of at least one mechanical stop of the beam cutting device for the workpiece.

15. The method according to claim 1, wherein after determination of the relative position and/or orientation of the workpiece on a workpiece support (according to step b)) and after determination of the at least one risk region (according to step d)), the at least one workpiece part to be cut out or the workpiece is repositioned, advantageously according to a previously created or modified cutting plan on the workpiece, and/or advantageously at least the support points, which lie below the workpiece or the at least one workpiece part to be cut out, are repositioned.

16. The method according to claim 1, wherein the determination of at least one risk region on the cutting contour of the at least one workpiece part to be cut out (step d)) and/or the defining of the at least one starting-cut point and/or a cut-away point for the cutting tool (step e)) depends on the geometry of the cutting contour, in particular on the cutting contour curvature of the at least one workpiece part to be cut out, wherein advantageously the starting-cut point is selected on a convex cutting contour section of the at least one workpiece part to be cut out, and/or advantageously the selection of the starting-cut point for the cutting tool on the cutting contour of the at least one workpiece part to be cut out is defined by means of at least one selection straight line, which is inclined with respect to the cutting contour point normal by a selection angle ($\beta$).

17. The method according to claim 1, wherein the defined starting-cut points or defined cut-off points of the workpiece parts to be cut out are lined up on the workpiece to optimise a cutting sequence and/or a positioning path of the cutting tool on the workpiece and the cutting process is carried out at one of the defined starting-cut points or cut-away points.

18. The method according to claim 1, wherein before step b) the contour size of the workpiece part to be cut out is defined and advantageously assigned to a previously defined contour size class; and/or
wherein the cutting plan is optimised with respect to the actual position of the workpiece support relative to the workpiece; and/or
wherein defining a sequence of at least two starting-cut points and/or cut-away points for the cutting tool on the cutting contours of at least two workpiece parts to be successively cut out in the sequence by taking into account more than one identified risk region on the cutting contours of the at least two workpiece parts to be cut out successively.

19. The method according to claim 1, wherein the at least one workpiece part comprises a first workpiece part and a second workpiece part, the first workpiece part and the second workpiece part being configured to be cut out successively and are arranged adjacent to each other, preferably side by side.

20. The method according to claim 19, wherein the workpiece parts are selected such that an intermediate positioning path is free of cut workpiece parts.

21. The method according to claim 1, wherein the method steps are imaged in a virtual space, wherein the workpiece support is virtual and the at least one cutting plan has at least one piece of information on the position and/or orientation of a virtual workpiece support relative to a virtual workpiece.

22. The method according to claim 21, wherein a set of cutting plans is specified with the at least one cutting plan and at least one further cutting plan, wherein the position and/or orientation of the virtual workpiece support in each cutting plan of the set of cutting plans is different and offset in the x and y direction.

23. The method according to claim 22, wherein the at least one cutting plan is selected from the set of cutting plans which has the greatest match of the at least one piece of information on the position and/or orientation of the at least one workpiece part to be cut out relative to the virtual workpiece support with an actually determined position and/or orientation of the workpiece support of the beam cutting device relative to the workpiece.

24. The method according to claim 21, wherein the cutting plan with respect to an actual position of the workpiece support is optimised relative to the workpiece.

25. The method according to claim 21, further comprising defining of a sequence of at least two starting-cut points and/or cut-away points for the cutting tool on the cutting contours of at least two workpiece parts to be successively cut out in the sequence by taking into account more than one identified risk region on the cutting contours of the at least two successively workpiece parts to be cut out.

26. The method according to claim 25, wherein the two workpiece parts to be cut out successively are arranged adjacent to each other, preferably side by side.

27. The method according to claim 26, wherein the workpiece parts are selected such that the intermediate positioning path is free of cut workpiece parts.

28. A computer-implemented method for automatically defining and producing geometric elements and/or movement commands for controlling a cutting tool of a beam cutting device which performs the method according to claim 21, wherein after step e) at least one data set comprising geometric elements and/or at least one movement command, advantageously a plurality of data sets comprising geometric elements and/or a plurality of movement commands, is automatically produced and stored, which at least specify the at least one starting-cut contour and/or specify at least the movement of the cutting tool to the one starting-cut point or to the at least one cut-away point .

* * * * *